US006332510B1

(12) United States Patent
Frederiksen et al.

(10) Patent No.: US 6,332,510 B1
(45) Date of Patent: Dec. 25, 2001

(54) GAS FLOW SILENCER

(75) Inventors: Eyvind Frederiksen, Soborg; Svend Frederiksen, Copenhagen, both of (DK)

(73) Assignee: Silentor Holding A/S, Hedehusene (DK)

( * ) Notice: Subject to any disclaimer, the term of this patent is extended or adjusted under 35 U.S.C. 154(b) by 0 days.

(21) Appl. No.: 09/147,883

(22) PCT Filed: Sep. 30, 1997

(86) PCT No.: PCT/DK97/00417

§ 371 Date: May 24, 1999

§ 102(e) Date: May 24, 1999

(87) PCT Pub. No.: WO98/14693

PCT Pub. Date: Apr. 9, 1998

(30) Foreign Application Priority Data

Sep. 30, 1996 (DK) .................................................... 1070/96
Jul. 4, 1997 (DK) .................................................... 0816/97

(51) Int. Cl.⁷ .................................................. F01N 1/24
(52) U.S. Cl. ............................................ 181/256; 181/272
(58) Field of Search .................................. 181/252, 255, 181/256, 258, 269, 272, 282

(56) References Cited

U.S. PATENT DOCUMENTS

| 1,015,698 | 1/1912 | Maxim . |
| 1,289,856 | 12/1918 | Maxim . |
| 1,510,791 | 10/1924 | Martel . |

(List continued on next page.)

FOREIGN PATENT DOCUMENTS

| 313447 | 5/1956 | (CH) . |
| 313645 | 6/1956 | (CH) . |
| 189988 | 10/1907 | (DE) . |

(List continued on next page.)

OTHER PUBLICATIONS

"Noise and Vibration Control", Leo L. Beranek, MIT, pp. 393–394.
"Report 1192: Theoretical & Experimental Investigation of Mufflers with Comments on Engine–Exhaust Muffler Design", Don. D. Davis, Jr., et al., Langley Aeronautical Laboratory, pp. 1–13 and pp. 28–31, with Appendix A (1950's).

(List continued on next page.)

Primary Examiner—Khanh Dang
(74) Attorney, Agent, or Firm—Birch, Stewart, Kolasch & Birch, LLP

(57) ABSTRACT

A device (a silencer) for silencing a flow of gas, such as an exhaust gas, comprises at least one acoustic chamber (1, 2, 3) through-flowed by gas, at least one inlet pipe (6) for leading gas into the device and at least one pipe or passage (4, 12, 13) interconnecting two chambers or a chamber and an exterior environment or chamber and is designed with such features, including such cross-sectional area transitions between pipes or passages (4, 6, 12, 13) and the chambers (1, 2, 3) that the sound attenuation achieved by the device is high while the pressure drop across the silencer is low and that high attenuation at low characteristic frequencies of flow systems comprising the device are obtained. One or more diffusers (10*a*, 12*a*, 13*a*) for diffusing at least part of the gas flow, e.g., at the inlet to the chambers may be comprised in the device. One or more monolithic bodies or catalyzers may be comprised in the device. Devices with curved or helical passages (FIG. 5) allowing a low natural frequency and embodiments having resonance chambers (FIGS. 10*a*, *b*) attenuating at selected frequencies are disclosed. The device may be used for vehicles, including ships or boats and for stationary installations, such as power plants or stationary engines. A method for designing and/or dimensioning the device for a given desired sound attenuation over a given frequency spectrum at given spatial restrictions is disclosed.

140 Claims, 13 Drawing Sheets

U.S. PATENT DOCUMENTS

| | | |
|---|---|---|
| 1,874,326 | 8/1932 | Mason . |
| 2,017,748 | 10/1935 | Bourne . |
| 2,075,316 | 3/1937 | Tyden . |
| 2,841,235 | 7/1958 | Curioni . |
| 3,018,841 | 1/1962 | Gerlich et al. . |
| 3,563,340 | 2/1971 | Duthion et al. . |
| 3,642,095 | 2/1972 | Fujii . |
| 3,692,142 | 9/1972 | Stemp . |
| 3,852,042 | 12/1974 | Wagner . |
| 3,897,853 | 8/1975 | Frederiksen . |
| 3,899,303 | 8/1975 | Gaysert . |
| 4,046,219 | 9/1977 | Shaikh . |
| 4,064,962 | 12/1977 | Hunt . |
| 4,094,645 | 6/1978 | Bailey . |
| 4,105,089 | 8/1978 | Judd . |
| 4,126,205 | 11/1978 | Bauerschmidt . |
| 4,203,503 | 5/1980 | Franco et al. . |
| 4,209,493 | 6/1980 | Olson . |
| 4,317,502 | 3/1982 | Harris et al. . |
| 4,392,549 | 7/1983 | Wrobel et al. . |
| 4,485,890 | 12/1984 | Harris . |
| 4,579,195 | 4/1986 | Nieri . |
| 4,601,168 | 7/1986 | Harris . |
| 4,601,363 | 7/1986 | Harris et al. . |
| 4,605,092 | 8/1986 | Harris et al. . |
| 4,635,753 | 1/1987 | Itani . |
| 4,848,513 | 7/1989 | Csaszar . |
| 5,016,438 | 5/1991 | Harris . |
| 5,043,147 | 8/1991 | Knight . |
| 5,150,573 | 9/1992 | Maus et al. . |
| 5,184,464 | 2/1993 | Harris . |
| 5,220,789 | 6/1993 | Riley . |
| 5,355,973 | 10/1994 | Wagner et al. . |
| 5,403,557 | 4/1995 | Harris . |
| 5,408,828 | 4/1995 | Kruecher et al. . |
| 5,426,269 | 6/1995 | Wagner et al. . |
| 5,484,575 | 1/1996 | Steenackers . |
| 5,578,277 | 11/1996 | White et al. . |
| 5,902,970 * | 11/1999 | Ferri ..................................... 181/252 |
| 5,936,210 * | 8/1999 | Borneby et al. ..................... 181/256 |

FOREIGN PATENT DOCUMENTS

| | | |
|---|---|---|
| 463156 | 7/1928 | (DE) . |
| 467515 | 10/1928 | (DE) . |
| 469259 | 12/1928 | (DE) . |
| 557140 | 8/1932 | (DE) . |
| 570630 | 2/1933 | (DE) . |
| 614930 | 2/1936 | (DE) . |
| 634222 | 8/1936 | (DE) . |
| 736635 | 6/1943 | (DE) . |
| 2715053 | 10/1978 | (DE) . |
| 2612421 | 3/1979 | (DE) . |
| 4130113 | 3/1992 | (DE) . |
| 3039742 | 5/1992 | (DE) . |
| 3641942 | 10/1992 | (DE) . |
| 9314441 | 2/1994 | (DE) . |
| 2307215 | 6/1999 | (DE) . |
| 2428964 | 6/1999 | (DE) . |
| 2429002 | 6/1999 | (DE) . |
| 128427 | 9/1974 | (DK) . |
| 169823 | 3/1995 | (DK) . |
| 0131350 | 1/1985 | (EP) . |
| 0158625 | 10/1985 | (EP) . |
| 0184060 | 6/1986 | (EP) . |
| 0410924 | 1/1991 | (EP) . |
| 0475398 | 3/1992 | (EP) . |
| 0556846 | 8/1993 | (EP) . |
| 0643799 | 3/1995 | (EP) . |
| 0683849 | 11/1995 | (EP) . |
| 0744536 | 11/1996 | (EP) . |
| 0728832 | 1/1997 | (EP) . |
| 728003 | 6/1932 | (FR) . |
| 2221618 | 10/1974 | (FR) . |
| 426769 | 5/1935 | (GB) . |
| 495576 | 12/1938 | (GB) . |
| 829012 | 2/1960 | (GB) . |
| 169581 | 7/1992 | (NO) . |
| 9321428 | 10/1993 | (WO) . |
| 24744 | 12/1993 | (WO) . |
| 9410430 | 5/1994 | (WO) . |
| 9418438 | 8/1994 | (WO) . |
| 9632572 | 10/1996 | (WO) . |

OTHER PUBLICATIONS

"XP–002056193: Program for the Computation of Absorptive Silencers in Straight Duets", Frommhold, et al., pp. 19–38, 1994.

"XP–002055498: Acoustical Filters and Mufflers", David, Jr., National Advisory Committee for Aeronautics, pp. 21–1.

"Volvo Original Buskatalysator: A Simple Solution for a Better Town Environment" 19092US1.MO1/MH/BV/1998 03 02.

"Reflection–Type Silencers for Internal Combustion Engine" Prof. Dr. Frederiksen, vol 6, pp. 17–25.

"XP–002055497: Prime Movers" pp. 251, 252, 254, and 256.

R.H. Warring, "Handbook of Noise and Vibration Control", 1970, Trade & Technical Press Ltd.

C.M. Harris, "Handbook of Noise Control", 1957, McGraw–Hill Cook Company Inc.

P. Brandstatt, et al, "Program for the Computation of Absortive Silencers in Straight Ducts", Applied Acoustics, vol. 43, No. 1, 1994, Oxford pp. 19–39.

"Ny Volvo–katalysator til busser miljotilpasser den kollektive trafik," (New Volvo catalyst for busses makes public transport environmentally friendly) Imagasian, Jan. 10, 1995, pp. 19.

"Rene busser er til gavn for bade dig og miljoet" (Clean busses are good for both you and the envirnoment!) Volvo Truck Parts Corporation, Sweden, undated.

"Der er forskel pa lyddaempere og lydpotter," Silentor Novum A/S, Nov. 1993.

* cited by examiner

A-A:

B-B:

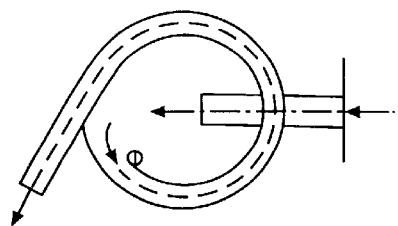
FIG. 11a
FIG. 11b
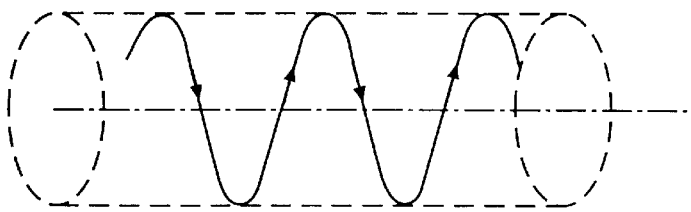
FIG. 11c
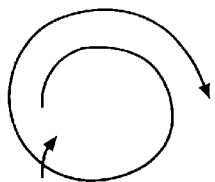
FIG. 11d
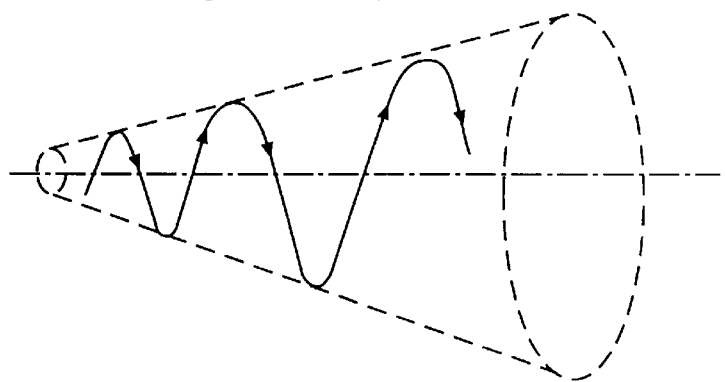
FIG. 11e
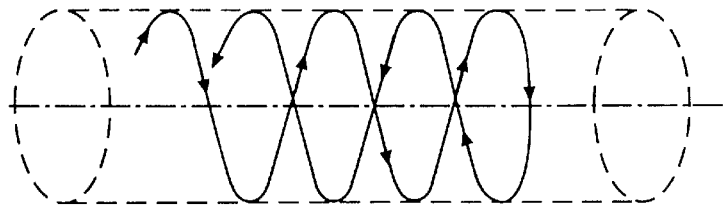

GAS FLOW SILENCER

This application is the national phase under 35 U.S.C. §371 of prior PCT International Application No. PCT/DK97/00417 which has an International filing date of Sep. 30, 1997 which designated the United States of America.

The present invention relates to a method for designing and/or dimensioning a device for silencing a flow of gas such as exhaust gasses originating from a combustion device, a method for silencing such a flow and a number of devices for silencing such gasses, a vehicle comprising one or more such devices and a stationary power generating installation comprising one or more such devices.

While a number of silencer designs are known, most of these are not particularly beneficial with respect to flow dynamic properties. As a result of intensive studies of the flow dynamic behaviour and requirements of silencer systems, the invention provides both basic physical principles to be complied with by silencer designs in order to obtain hitherto unattainable combinations of effective noise damping, low back pressure (pressure drop across the silencer device) and small size—and specific novel mechanical design features, such as physical conformations of the passages or bodies involved in the flow path—which cooperate with a suitable overall design to provide superior combinations of performance results.

In addition, the invention provides an efficient computerized or computer-aided method for designing and producing silencers, which method is suitable for arriving at suitable, flow-dynamically balanced or optimized silencer designs with design efforts and design time consumptions that are realistic and competitive (with even the most powerful presently available supercomputer systems, the solution of the discretized Euler equations and, in case of viscous computations, the discretized Navier-Stokes equations which are the governing equations for the flow in silencer systems is not realistically possible within an acceptable time span, in particular not for unsteady, turbulent flows). In particular in case of such flows, solution of the above-mentioned equations requires an unacceptable number of floating operations, not possible within acceptable time spans; according to the invention, it has been found that a rational utilization of a few relatively simple, but carefully selected algebraic equations, combined with empirically determined data, will provide a guide to near optimal or optimal solutions with minimum computer requirements which are met even by normal commercial personal computers. While it is contemplated that the method will to a large extent be used to design and produce silencer systems of the novel types mentioned above, it also has a very important utility as a method for a rational and economical design and production of silencer systems of types known per se.

It is well known within the art to silence such a flow by directing the flow into an inlet passage to a container, through one or more chambers in said container intercommunicating by means of passages, through a diffuser associated with one of said passages and into an outlet passage from said container.

The design and/or dimensioning of such known devices has been based on experience, empirical iterations, partial application of acoustic theory, and traditional solutions.

This method of design and/or dimensioning has traditionally resulted in attenuation of the sound intensity of the exhaust flow to a degree that has been acceptable in the past. However, this known method has not consistently been able to provide sound intensity attenuation in general, and in particular for special applications, that complies with the increasingly low acceptance of noise in modern society.

For applications in the mass production industry of for instance gasoline and diesel engines, the great number of modifications and design changes based on experiments and empirical methods allowed by the economical resources available therefor has resulted in some relatively acceptable silencing devices. However, as the method is to a great extent based on trial and error, it has not been possible to consistently translate the success in one case to a general principle for achieving success in apparently similar cases, not to speak of rather different cases.

In the case of tailor-made solutions for one-off installations or very small production series, application of the traditional method has not been able to provide optimal solutions except in exceptional cases where the element of luck has been a factor. This is owing to the fact that the economical and practical possibilities for carrying out experiments and consequent design and/or dimensioning modifications and changes are not at hand.

Furthermore, the large number of parameters and considerations having implications for the sound attenuation in a silencing device have in the past prevented those skilled in the art from designing and dimensioning such a device simply and reliably in such a manner that a desired sound attenuation with an acceptable loss of pressure through the device and acceptable overall dimension were consistently achieved.

One main object of the invention is to provide a method for simply and reliably designing and/or dimensioning a device comprising certain elements and for silencing a flow of gasses originating from a flow system, e.g., a combustion device, wherein the same general mathematical expressions are applied in connection with the particular given parameters regarding at least the space constraints and the desired attenuation of noise sources and, in many cases also the acceptable pressure loss across the device, the sound spectra to be attenuated, and the flow system.

The method of the invention is typically applied to a device of the type comprising one or more passages leading the flow into and/or out of one or more chambers of the device and one or more diffusers diffusing at least a part of the gas flow through one or more of the passages, the geometric configuration and arrangement and the relative dimensions of the one or more chambers and the one or more passages being designed and/or dimensioned mainly on the basis of the number of changes in the cross sectional area of the gas flow, the values of the individual changes in cross sectional area, the volume of each of the one or more chambers and the length of each of said one or more passages.

Hereby, a consistent compliance with the desired attenuation of the sound spectra has been achieved for the said given particular parameters while the overall dimensions of the device are minimized.

One aspect of the invention relates to a device for silencing a gas flow directed therethrough and being adapted for installation in a flow system, said device comprising:
   a casing,
   at least one acoustic chamber contained in the casing, said chamber being through-flowed by gas,
   at least one inlet pipe for leading gas into one of said at least one acoustic chamber,
   at least one passage of a length L and of a representative cross-sectional area a for leading gas from each one of the at least one acoustic chamber to another of the at least one acoustic chamber or to an exterior environment or an exterior chamber, optionally one or more monolithic bodies comprised in each of one or more of said at least one acoustic chamber, said device showing at least two through-flowed transitions of cross-sectional area for the flow of the gas between a relatively lower cross-sectional area a, and a relatively higher cross-sectional area $A_i$, The device fulfilling the following criteria:

(i) the average sound attenuation $\overline{\text{AdB}}$ conferred by each transition of cross-sectional area, approximated by the following expression:

$$\overline{\text{AdB}} = \frac{1}{n}k\sum_{i=1}^{n}\log_{10}\frac{A_i}{a_i},$$

n being the total number of transitions of cross-sectional area of the device, $A_i$ being the relatively higher cross-sectional area at the i'th transition of cross-sectional area of the gas flow, $a_i$ being the relatively lower cross-sectional area at the i'th change of cross-sectional area of the gas flow, k being an empirically determined constant of the value 6.25 dB, is at least 2.9 dB when the device comprises no more than two acoustic chambers, 1.8 dB when the device comprises three acoustic chambers, 1.1 dB when the device comprises 4 or more acoustic chambers, (ii) the pressure loss over each acoustic chamber expressed as the dimensionless parameter $\zeta_j'$, defined as the ratio between the static pressure loss over the chamber and the dynamic pressure at a location in said passage:

$$\zeta_j' = \frac{\Delta p_j}{\frac{1}{2}\rho u^2},$$

$\Delta p_j$ being the static pressure loss over the j'th chamber, exclusive of the static pressure loss over a monolith optionally comprised in the j'th chamber, $\rho$ being the density of the gas at said location, u being a velocity of the gas at said location, preferably the mean gas velocity, is at the most 1.5.

Another aspect of the invention relates to a device for silencing a gas flow directed therethrough and being adapted for installation in a flow system, said device comprising:

a casing, at least one acoustic chamber contained in the casing, said chamber being through-flowed by gas, at least one inlet pipe for leading gas into one of said at least one acoustic chamber, at least one passage of a length L and of a representative cross-sectional area a for leading gas from each one of the at least one acoustic chamber to another of the at least one acoustic chamber or to an exterior environment or an exterior chamber, optionally one or more monolithic bodies comprised in each of one or more of said at least one acoustic chamber, said device showing at least two transitions of cross-sectional area for the flow of the gas between a relatively lower cross-sectional area $a_i$ and a relatively higher cross-sectional area $A_i$, at least one passage selected from said at least one passage being curved, wherein the following applies to at least one selected chamber selected from said at least one acoustic chamber:

the mean cross-sectional area $A_j$ of each of said selected chamber is at least four times the largest of:
the sum of all cross-sectional area of passages leading gas to the selected chamber, $a_1$, and
the sum of all cross-sectional areas of passages leading gas from the selected chamber, $a_2$, the mean cross-sectional area, $A_j$, being defined as the mean value of all cross-sectional areas along a mean trajectory for sound waves travelling from across the selected chamber, the volume of the at least one selected chamber, $V_j$, is at least $8(\sqrt{(a_1+a_2)/2})^3$, $a_1$ and $a_2$ being defined as stated above.

the cross-sectional area, $A_j$, and the volume, $V_j$, including any elements belonging to sound absorptive material inside the selected chamber and any other parts being in acoustic communication with the selected chamber.

A further aspect of the invention relates to a device for silencing a gas flow directed therethrough and being adapted for installation in a flow system, said device comprising:

a casing, at least two acoustic chambers contained in the casing, said chambers being through-flowed by gas, at least one inlet pipe for leading gas into one of said at least two acoustic chambers, at least one passage of a length L and of a representative cross-sectional area a for leading gas from each one of the at least two acoustic chambers to another of the at least two acoustic chambers or to an exterior environment or an exterior chamber, optionally one or more monolithic bodies comprised in each of one or more of said at least two acoustic chambers, said device showing at least two through-flowed transitions of cross-sectional area for the flow of the gas between a relatively lower cross-sectional area $a_i$ and a relatively higher cross-sectional area $A_i$, said inlet pipe being continued by a flow deflecting element causing the gas to flow with a radial component and for causing pressure recovery to the flow upstream of a first one of said at least two acoustic chambers, wherein said passage comprised at least one diffuser for leading the gas flow into a second one of said at least two acoustic chambers, the diffuser of said passage being of a different type than a radial diffuser.

Sound absorptive material is preferably provided within at least one of the at least one acoustic chamber. Sound absorptive material may be provided within each of the at least one acoustic chamber.

Preferably, the local natural frequency, $f_e$, of at least one system comprising the gas of two consecutive acoustic chambers $AC_j$ and $AC_{j+1}$ and the gas of the passage interconnecting said two acoustic chambers, approximated by the following expression:

$$f_e = \frac{c}{2\pi}\sqrt{\frac{a}{L}\left(\frac{1}{V_j} + \frac{1}{V_{j+1}}\right)},$$

$V_j$ and $V_{j+1}$ being the volumes of the chambers $AC_j$ and $AC_{j+1}$ respectively (the volume $V_{j+1}$ being set to infinite when the chamber $AC_j$ is connected to an exterior environment or an exterior chamber in a downstream direction), a being a representative cross-sectional area of the passage interconnecting the two consecutive acoustic chambers, L being the length of the passage, and c being the local sound velocity,
is at the most 0.75 times a characteristic frequency of the flow system. For many applications of the device, it is preferred that the local natural frequency, $f_e$, is at the most 0.5 times the characteristic frequency of the flow system, such as 0.4 times or 0.3 times or even 0.25 times, such as 0.2 times, 0.15 or 0.1 or even lower.

Preferably the value $\zeta_j'$ of each acoustic chamber is at the most 1.0. The value of $\zeta_j'$ of at least one acoustic chamber is preferably at the most 0.75, or even lower such as 0.5, 0.25, 0.2 or even lower. Special designs of the device allow for a value less than or equal to 0, as will be discussed below.

The average sound attenuation $\overline{\Delta dB}$ conferred by the transitions of cross-sectional area, approximated by the expression given under (i) in claim 1 is preferably at least 3.7 dB when the device comprises no more than two acoustic chambers,
2.9 dB when the device comprises three acoustic chambers,
1.9 dB when the device comprises 4 or more acoustic chambers, or even at least:

5.6 dB when the device comprises no more than two acoustic chambers,
4.8 dB when the device comprises three acoustic chambers,
3.7 dB when the device comprises 4 or more acoustic chambers.

In the device according to the invention curvatures, preventing flow separation, are preferably applied to at least part of the contour of the outlet and/or inlet of a pipe or passage of the device, said pipe or passage being the inlet pipe or its extension into the apparatus and/or the outlet pipe or its extension into the apparatus and/or a passage connecting two chambers. Thereby vena contracta phenomena may be eliminated or at least reduced, thereby reducing the pressure loss over the device.

A device according to the invention may comprise one or more radial diffusers and/or one or more axial diffusers and/or one or more circular conical diffusers and/or one or more annular diffusers and/or a plurality of conical diffusers arranged on a substantially cylindrical surface and/or one or more diffusers for reversing the direction of flow and/or one or more double diversion diffusers, at least some of the above-mentioned diffuser types being known per se. Any other diffuser types known per se may be applied.

Each of the at least one acoustic chamber may be substantially cylindrical, and one or more outlets from said at least one diffuser may be located substantially at the axial centre of the chamber associated with said diffuser. When the chamber is substantially cylindrical it defines a cylinder axis. Preferably, one or more outlets from said at least one diffuser are located at a distance from the cylinder axis of approximately two thirds of the radius of the acoustic chamber, so as to obtain fixation of pressure nodes. This principle, known per se, is described in detail in European patent 0 683 849.

In a device comprising m acoustic chambers, m being at least 2, the following preferably applies to each of at least m−1 of the acoustic chambers:

the inlet passage leading gas to the chamber is provided with a diffuser or a diffuser element, a curvature or curvatures, preventing flow separation, are applied to at least part of the contour of all passages leading gas out of the chamber,
the pressure loss across the chamber expressed as $\zeta_j'$ is less than or equal to 1.5,
the approximated average sound attenuation $\overline{\Delta dB}$ conferred by each transition of cross-sectional area is at least:
2.9 dB for m=2,
1.8 dB for m=3,
1.1 dB for m>3, and wherein the following applies to each of at least m−2 of the passages interconnecting two consecutive acoustic chambers or interconnecting an acoustic chamber and the exterior environment or chamber:

the approximated local natural frequency, $f_e$, is at the most 0.75 times a characteristic frequency of the flow system.

The following may apply to each of at least m−1 of the acoustic chambers:

the pressure loss across the chamber expressed as $\zeta_j'$ is less than or equal to 1.0,
the approximated average sound attenuation $\overline{\Delta dB}$ conferred by each transition of cross-sectional area is at least:
3.7 dB for m=2,
2.9 dB for m=3,
1.8 dB for m>3.

For some applications the following may apply to each of at least m−1 of the acoustic chambers:

the pressure loss across the chamber expressed as $\zeta_j'$ is less than or equal to 1.0,
the approximated average sound attenuation $\overline{\Delta dB}$ conferred by each transition of cross-sectional area is at least:
5.6 dB for m=2,
4.8 dB for m=3,
3.7 dB for m>3, and wherein the following applies to each of at least m−2 of the passages interconnecting two consecutive acoustic chambers or interconnecting an acoustic chamber and the exterior environment or chamber:

the approximated local natural frequency, $f_v$, is at the most 0.5 times a characteristic frequency of the flow system.

It should be understood that the above performance criteria may be fulfilled by all chambers and all passages of the device by a device according to the invention.

The sound level of self-generated noise of each one of said at least one acoustic chamber at maximum gas flow rate is preferably less than 5 dB(A) higher than the self-generated noise of a circular cylindrical reference chamber through-flowed at said gas flow rate, the cross-sectional area of the inlet passage leading gas into said acoustic chamber being $a_1$, the cross-sectional area of the passage leading gas from said acoustic chamber being $a_2$, said reference chamber:

being of the same volume as each of said at least one acoustic chamber,
having a length equal to its diameter,
having flat end caps,
being provided with centrally positioned holes in its flat end caps,
having a first end cap which is connected to a cylindrical inlet pipe of a cross-sectional area which is approximately equal to $a_1$, the terminating surface of said cylindrical inlet pipe being aligned with said first end cap, having a second end cap which is connected to a cylindrical outlet pipe of a cross-sectional area which is approximately equal to $a_2$, said cylindrical outlet pipe having a rounded inner edge at its interconnection with said second end cap and being aligned with said second end cap.

The sound level of self-generated noise of each one of said at least one acoustic chamber at maximum gas flow rate may be less than 4 dB(A) higher than the self-generated noise of the reference chamber, or even less than 3 dB(A), such as 2 dB(A) or 1 dB(A). A sound level of self-generated noise which is less than the self-generated noise of the reference chamber may even be achieved with a device according to the invention.

In a device according to the invention, the distance between an inlet to a chamber and the inlet to a passage is preferably so large that substantially no unstable flow occurs in the chamber.

According to the invention, the generatrix of at least part of at least one curved passage selected from said at least one passage may be wound in a peripheral direction, at least part of the curved passage having a plane spiral form. The generatrix of at least a part of at least one curved passage selected from said at least one passage may be wound in a peripheral direction, said part of said curved passage extending in a longitudinal direction, so as to form a screw-like helical form. Thereby, all three dimensions of space are utilized in order to achieve a relatively long passage or relatively long passages.

By winding the connecting passage, i.e. by utilizing the third spatial dimension, the length of the passage may be significantly increased, the natural frequency of the silencing device thus being decreased, cf. equation (1). The flow of the passage may constitute a flow cross sectional area increase in the flow direction. Thus, a diffusing effect may be obtained for static pressure recovery. The cross sectional area increase may be two- or three-dimensional. The passage may have any cross sectional shape, such as rectangular, circular, ellipsoidal or any other shape.

The curved part of the passage may extend radially over an angle between 0° and 90°, or over an angle between 90° and 180°, or over an angle between 180° and 270°, or over an angle between 270° and 360°, or over an angle between 360° and 720°, or over an angle of 720° or more.

The device according to the invention may comprise at least two acoustic chambers, wherein the curved passage interconnects two chambers, a first of which surrounds a second one, the second chamber thus being 'embedded' in the first one.

The generatrix of the curve part of the passage may extend along a surface of revolution, so as to define itself a surface of revolution. The surface of revolution may have any shape, e.g., conical.

At least one monolithic body or a monolith such as a catalyser or a particle filter, may be positioned upstream or downstream of an inlet passage and/or an outlet passage of the one or more chambers, in some embodiments the monolithic body may be positioned substantially immediately upstream or substantially immediately downstream of said inlet passage and/or said outlet passage of the one or more chambers. The monolithic body may be of an annular form.

In the present context, the term "monolithic body" or "monolith" designates, as is customary in the art, a body of an overall or macroscopic monolithic appearance, often a cylindrical body, which has a structure allowing an overall axial gas flow through the body. The term "monolithic" does not rule out that the body could be made from a plurality of segments joined or arranged together. The structure allowing an overall axial gas flow through the body will depend on the construction and material of the monolith; two typical relevant monolith types are:

a monolith made from a corrugated foil wound up cylindrically so that the corrugations provide axial gas flow channels, and a monolith made of a particulate ceramic material, e.g., silicon carbide particles sintered together, and having a honeycomb structure comprising axial channels constituted by a plurality of coextending throughgoing passages separated by common passage walls, the passages being closed at the inlet and the outlet end, alternately. Thus, in a filter body of this kind, the gas travels into the passages open at the inlet side, through the walls into the passages open at the outlet side and then out of the filter body.

Monoliths are sometimes inserted into silencers so as to combine silencing with gas purification, either in catalytic processes, in mechanical filtering, or in both. In most cases such monoliths are placed within one or more chambers of the silencer. Monoliths can provide significant silencing at medium and high frequencies, but less silencing at low frequencies. Obviously, monoliths cause added pressure drop to the piping system.

In case the purification relies solely on catalysis, the monolith is usually made as a honeycomb structure with straight channels, termed a through-flow monolith. The walls are thin, so that the open frontal area is typically 70–90%, depending mainly on the material (ceramic, metal, etc.).

Alternatively, a monolith may be made as a wall-flow monolith, i.e. the channels are perforated and partly blocked, so that the gas flow is forced to pass through those perforations, describing a tortuous pathway through the monolith. Such a monolith is used either for pure filtering or for combined filtering and catalytic treatment of the gas. Sometimes the open frontal area becomes less than 70%. Wall-flow monoliths cause pressure drops which are substantially higher than pressure drops of through-flow monoliths.

The silencing effects of monoliths can roughly be described as follows:

1. The flow within the thin channels causes high viscous friction which dampens mainly medium and high frequencies.
2. The porosities of the channels provide an aggregate acoustic volume which adds to the volume of the chamber in which the monolith is placed.
3. At the entrance and at the exit of the monolith there is an effective change in cross-sectional area which causes sound reflection, in the same way as occurs at flow entrances and flow exits connecting silencer chambers to passages. However, the relative change in cross sectional area is normally much smaller in the case of monoliths, in particular in connection with through-flow monoliths.

Since monoliths are usually fixed to the casing by an annular ring element, the effective change in cross section usually is somewhat bigger than what is given by the frontal area percentage of the monolith as such. This percentage is referred to as the effective frontal area percentage.

On the basis of this understanding, monoliths are handled in the following way as elements of silencers designed and dimensioned according to the invention:

when the effective frontal area percentage of the monolith placed in a chamber is bigger than approximately 50%, the porosity of the monolith is regarded as an extension to the chamber volume, when the effective frontal area percentage of the monolith is smaller than approximately 50%, the monolith is treated as a connecting passage with an effective cross sectional area roughly equally the sum of cross sectional areas of all channels within the monolith, the pressure drop across the monolith is added to the pressure drop of the silencer without the monolith, i.e. a silencer having the same dimensions and geometry, but without the monolith. This means that when dimensioning a silencer for a given total sound attenuation, SDB, and for a given pressure drop, SDP, the pressure drop across the monolith should be subtracted from SDP to determine the residual pressure drop at disposal for silencer design.

For given flow velocities and gas temperatures, approximate pressure drops across monoliths can be calculated on the basis of formula and experimentally based constants given in literature. More precise predictions can be made on the basis of data provided by manufacturers, or in rather simple laboratory experiments.

A number of interesting embodiments of the aspects of the device, as well as a flow system incorporating the device and embodiments of the method for designing or dimensioning the device appear from claims 63–107.

It should be understood that steps (iii)–(vii) of the iterative procedure outlined in claim 96 and/or 98 can be performed in any desired order.

At least one pipe or passage may be annular, constituted by an inner cylinder and by an outer cylinder. The annular pipes or passages may be provided with means, such as e.g. walls, for segmentating the annular passage into a number of sub-passages having a rectangular or circular cross sectional outline or any other cross sectional outline. Thereby, rotating stall phenomena may be eliminated or at least reduced.

At least one of the at least one pipe or passage which is annular may be a passage connecting two chambers. The annular passage may diffuse at least part of the gas flow directed therethrough. The at least one pipe or passage being annular may thus constitute a flow cross sectional area increase in the flow direction. By applying an annular passage constituting a cross sectional area increase it is possible to achieve a relatively large cross sectional area increase over a relatively short longitudinal distance while avoiding flow separation in the passage. Thus, a relatively large pressure recovery may be achieved over a relatively short distance which is important, e.g., for applications where the available space is limited, e.g., in vehicles such as trucks.

The annular passage may comprise a constant flow area part and an outlet diffuser part. The constant flow area part contributes to the length of the connecting passage.

The inner cylinder may extend into said first chamber by a cylinder of substantially the same diameter as said inner cylinder, and said outer cylinder may be connected to a flow-guiding body with a curvature, so as to obtain optimal flow conditions through the device.

Sound absorptive material is preferably contained within said cylinder and/or within a continuation cylinder extending into said first chamber and/or within a continuation cylinder extending into said second chamber. Obviously, one aim of providing sound absorptive material is to reduce the sound level of the gas flow. Though in preferred embodiments, the sound absorptive material is comprised within said cylinders, it may additionally/alternatively be comprised at the outer periphery of the surrounding casing. Preferably, at least some of the sound absorptive material communicates with the gas flow, e.g., through a perforated wall. Thus, at least part of the continuation cylinder may be perforated. It is preferred to apply said cylinders which at least partly separate the sound absorptive material from the gas flow in order to avoid that the sound absorptive material is being damaged by the gas flow. At locations of cross-sectional increase or decrease or in the vicinity of such locations, the walls are preferably non-perforated so as to avoid damaging of the sound absorptive material and/or so as to avoid undesired flow perturbations which may increase pressure loss or generate turbulence.

In a preferred embodiment, the outflow from said connecting passage passes into an annular passage inside said second chamber, said annular passage being made up of at least a perforated portion of an inner cylinder and an outer, perforated cylinder, both said cylinders separating sound absorptive materials from gas flow within said second chamber. The outflow from the connecting passage may pass directly into an annular passage.

In order to obtain optimal flow conditions in the device, unstable flow conditions in the devices according to the invention should be avoided. Thus, for example, the distance between the inlet to the first chamber and the inlet to the annular passage should be so large that essentially no unstable flow occurs in the first chamber.

With the aim of preventing unstable flow in the first chamber and/or allowing for a rather long passage, the distance may be at least 2% larger than the distance below which unstable flow would occur. Preferably, said distance should be at least 5% larger than the distance below which unstable flow would occur, normally at least 10% larger. When the total length of the device is limited, it is not desired that the distance is more than 50% larger than the distance below which unstable flow would occur, however for some applications the distance may exceed said 50%.

The device according to the invention is adapted for being connected to a flow system, e.g., the exhaust system of a vehicle comprising an internal displacement engine and/or a turbo machine or it may be suited for being connected to the exhaust system of a stationary power generating installation comprising an internal displacement engine and/or a turbo machine. The above mentioned vehicle may be any vehicle, such as e.g., a diesel engine powered truck, a bus, a car or a railway locomotive, a petrol, a gasoline or a gas engine powered truck, bus, car or any other moveable, engine driven device. The vehicle may also be any ship or boat having a combustion device. The stationary power generating installation may be a power station having one or more gas turbines driven by flow originating from suitable combustion means, such as, e.g., one or more boilers, fuel engines or other combustion means.

One major benefit of a device according to the invention is a significant reduction of pressure loss over the device compared to known devices. The reduction of pressure loss over the device reduces the fuel consumption of the combustion device and increases the power generated by the combustion device at a given fuel consumption. The pressure drop may be expressed as the dimensionless parameter $\zeta$ being defined as the ratio between the pressure loss over the device and the dynamic pressure at an appropriate location in the device or adjacent to the device, i.e.:

$$\zeta = \frac{\Delta p}{\frac{1}{2}\rho u^2} \qquad (3)$$

where:

Δp is the pressure drop over the device,

ρ is the density of the gas at said location, u is a velocity of the gas at said location, preferably the mean gas velocity.

An appropriate location could be, e.g., the inlet pipe, the outlet pipe, a location upstream of the inlet pipe, a location downstream of the outlet pipe, or any appropriate position inside the device where the flow velocity corresponds to the gas flow rate originating from the combustion device. As will be illustrated in the example below, the invention provides a device for silencing a gas flow, the device having a low ζ-value.

In most embodiments of the invention, ζ will be lower than 10. Typically, it will be between 0.5 and 4.

The pressure drop across a silencer of a given type is typically roughly proportional to the number of chambers.

Therefore, when analyzing pressure drops, it is expedient to focus the ζ-value per chamber, ζ', defined as:

$$\zeta' = \frac{p_1 - p_2 - \Delta p_m}{\frac{1}{2}\rho u_2^2},$$

where:

$p_1$ is the static pressure at a suitable location in the chamber inlet passage(s), $p_2$ is the static pressure at a suitable location in the chamber outlet passage(s), $\Delta p_m$ is the static pressure drop across a monolith optionally comprised in the chamber, $u_2$ is the mean flow velocity in the outlet passage(s), the suitable location being, e.g., halfway between passage inlet and outlet in case of a passage connecting two chambers, substantially immediately upstream of the first chamber in case of an inlet passage to the silencer (unless when the inlet passage extends into the silencer and shows a decrease of cross-sectional area for the gas flow; in that case $p_1$ is the static pressure taken at the most upstream position where the mean flow velocity reaches a maximum), and substantially immediately downstream of the last chamber in case of an outlet passage of the silencer.

One reason for subtracting the pressure drop across a possible monolith is that such an element normally contributes only to a small extent to low frequency sound attenuation while causing a substantial pressure drop in addition to the pressure drop across the chamber. Provided the monolith is inserted in an appropriate way, the pressure drop across a silencing chamber having a monolith comprised therein may be expressed as the sum of the pressure drop across the monolith and the pressure drop across the chamber when having no monolith comprised therein.

In a preferred embodiment of the invention, ζ' will be below 1.5. In further embodiments it will be lower than 1.0, or lower than 0.5, or even lower than 0. Negative values can be achieved when a diffuser is fitted onto the chamber inlet passage, and the flow cross-sectional area of an outlet passage is substantially larger than the flow cross-sectional area of an inlet passage, so that chamber pressure drop is rated against a rather small dynamic pressure prevailing in the outlet passage. In embodiments of the invention, ζ' is usually below 1.0, when flow cross-sectional areas of passages are of equal or almost equal size.

The combustion device/means mentioned in the present text may be an internal combustion engine, such as a diesel, petrol, gasoline or gas engine, e.g. a two or four stroke piston engine, a Wankel engine or a gas turbine connected to a boiler or any other appropriate combustion or energy extracting device, e.g., the combustion system of a stationary power generating installation, such as power station.

The device according to the invention may preferably be applied for silencing a flow of gasses originating from a combustion means, the device being of the type comprising a first container with one or more compartments or chambers each having one or more inlet passages and one or more outlet passages, and at least one diffuser associated with one or more inlet passages and/or one or more outlet passages, the flow of gasses being directed into said one or more inlet passages and out of said one or more outlet passages and at least partly through said at least one diffuser, the method comprising applying the following expressions for designing and/or dimensioning the geometric configuration and arrangement and the relative dimensions of the one or more chambers, the one or more inlet passages, the one or more outlet passages and the at least one diffuser:

$$f_e = \frac{c}{2\pi}\sqrt{\frac{a}{L}\left(\frac{1}{V_1} + \frac{1}{V_2}\right)} \quad (1)$$

and $$\Delta dB = k\, dB \log A/a \quad (2)$$

where $f_e$ is the local natural frequency of a system of two volumes interconnected by a passage, c is the sound velocity, a is the representative cross sectional area of the passage, L is the length of the passage, $V_1$ is one volume, $V_2$ is the other volume, $V_2$ being set to infinite when said passage interconnects a chamber with an exterior environment, e.g., the atmosphere, ΔdB is the sound attenuation provided by each chamber inlet and outlet, k is a constant, and A is the representative cross sectional area of a chamber upstream or downstream relative to the respective passage with respect to the flow direction.

The invention also relates to a method for silencing a flow of gasses, the method comprising:

directing the flow through a device comprising one or more passages leading the flow into and/or out of one or more chambers of the device and diffusing at least a part of the flow through one or more diffusers, the geometric configuration and arrangement and the relative dimensions of the one or more chambers and the one or more passages being designed and/or dimensioned mainly on the basis of the number of changes in the cross sectional area of the gas flow, the values of the individual changes in cross sectional area, the volume of each of the one or more chambers and the length of each of said one or more passages.

The invention further relates to a device for silencing a gas flow directed therethrough the device comprising one or more passages for leading the flow into and/or out of one or more chambers of the device and one or more diffusers for diffusing at least a part of the gas flow through one or more of the passages, the geometric configuration and arrangement and the relative dimensions of the one or more chambers and the one or more passages being designed and/or dimensioned mainly on the basis of the number of changes in the cross sectional area of the gas flow, the values of the individual changes in cross sectional area, the volume of each of the one or more chambers and the length of each of said one or more passages.

According to a further aspect of the invention, a vehicle comprising an internal displacement engine and/or a turbo machine and a device according to the invention is provided, the device being comprised in the exhaust system of the vehicle.

The invention further relates to a stationary power generating installation comprising an internal displacement engine and/or a turbo machine and a device according to the invention, the device being comprised in the exhaust system of the power generating installation.

In the following, embodiments of the silencing device according to the invention and of the method according to the invention for designing and/or dimensioning a silencing device will be explained with reference to the drawings, in which FIG. 1 shows a representative graph illustrating silencer performance versus unattenuated noise source spectrum, FIG. 2 shows a representative graph illustrating an example of an infrasound noise spectrum, shown linearly (unweighted) and subjected to the so-called A-weighting, respectively, FIG. 3a is a diagrammatic representation in longitudinal section and cross sections along line I—I (FIG. 3b) and II—II (FIG. 3c) of a silencer comprising elements associated with the method for designing and/or dimensioning according to the invention, FIG. 4 is a partial (lower half not shown in section) longitudinal section of a silencing device according to the invention, the design of which has been performed using the method of the invention, FIG. 5 is a longitudinal section of a somewhat generalized silencer illustrating key variables in understanding the principle of a coil-shaped, helical or curved passage and the sometimes critical distance between a chamber inlet and a chamber outlet, FIG. 6 is a longitudinal section of an interesting embodiment of a silencing device of the invention, suitable, e.g. for a truck, FIG. 7 is a longitudinal section of another interesting embodiment of a silencing device of the invention, suitable, e.g., for a truck, FIGS. 8(a)–8(e) show sections of an interesting embodiment of a two-chamber silencing device according to the invention with a helical connecting passage between the chambers, with FIG. 8(a) being a view taken along line B—B of FIG. 8(c);

FIG. 8(b) being a view taken along line C—C of FIG. 8(c);

FIG. 8(c) being a view taken along line A—A of FIG. 8(a);

FIG. 8(d) being a view taken along lien D—D of FIG. 8(c); and

FIG. 8(e) showing a part of the inner cylinder,

FIGS. 9(a) and 9(b) show an interesting compact embodiment of a two-chamber silencing device according to the invention with a helical connecting passage between the chambers and incorporating a monolith, e.g., a catalyser, with FIG. 9(a) being a view taken along line A—A of FIG. 9(b) and with FIG. 9(b) being a view taken along line B—B of FIG. 9(a), FIGS. 10(a) and 10(b) show two examples of resonators added to a main silencer according to the invention, and FIGS. 11(a)–11(j) show various principles of curved/helical forms and embodiments, with FIG. 11(a) showing a cross sectional view of a cylindrical silencer with a tail pipe composed of a helical or spiral part, and a short, straight part, FIG. 11(b) showing a screw-like helical generatrix form of a passage, FIG. 11(c) showing a plane, spiral generatrix form of a passage, FIG. 11(d) showing a conical, screw-like generatrix form for a passage, as an example of the winding radius varying along the longitudinal direction, FIG. 11(e) showing a winding generatrix form for a passage, with an upstream part extending in one direction, and a downstream part extending in the opposite direction, FIGS. 11(f) and 11(g) showing sketches of an embodiment of device according to the invention in which a first chamber is contained within a second chamber, the generatrix of the connecting passage being a plane spiral, FIG. 11(h) showing two parallel, screw-like helical generatrix forms, which can be adopted for a helical passage being divided into two parallel passage parts, FIG. 11(i) illustrating how a curved passage form can be adopted, both for providing a prolonged passage, and for reducing the change of flow direction within a chamber, FIG. 11(j) showing a detail of an embodiment of the invention being a variation of the embodiment shown in FIG. 9.

In FIG. 1, S1 shows an unattenuated noise source spectrum, e.g., after subjection to the so-called A-weighting, whereas S2 shows the spectrum of the attenuation caused by a silencer (which is to be subtracted from S1 to obtain the resulting attenuated spectrum). According to the invention, silencers are preferably designed in such a way that the lowest natural frequency, $f_e$, for passages of the silencer, is lower than a characteristic frequency, $f_{char}$, of the unattenuated noise source. In most cases, $f_{char}$ is the frequency at which the A-weighted spectrum has its maximum P1, P2 being a secondary peak. A-weighting is commonly adopted to take into account the frequency-dependent sensitivity of the human ear. Most noise limit standards are based on dB(A).

Sometimes A-weighting can be considered to cause exaggerated suppression of low frequencies. An important example of this occurs when the noise limit to be met is located inside a building at a distance from the noise source. In such cases sound is attenuated, both due to distance and due to insulation caused by walls, windows etc, so that the A-weighting underrates the low frequencies (which are not particularly attenuated in this situation). It may then be more appropriate to use dB(C)-weighting instead for the unattenuated sound source.

These years increasing concern is being raised about the possible disturbance to humans caused by infrasound, i.e. sound of lower frequencies than can be heard, roughly below 20 Hz. Although the matter is controversial, increasing medical evidence is being accumulated to support the assumption that disturbances may be real and not only imagined by overly concerned people. Drafts have been made of how to evaluate infrasound in practice, but no commonly accepted standards have yet been agreed upon.

Since the present invention is particularly efficient in providing silencers with strong low-frequency attenuation to gas flow noise, it has an interesting potential for combating infrasound. FIG. 2 illustrates how, as a first suggestion, the simple linear, i.e. non-weighted, unattenuated spectrum SL, can be used to more realistically assess the infrasound contribution having a maximum peak PL which is within the infrasound frequency range. When changing over from A-weighting (which suppresses infrasound), the maximum peak is seen to shift from PA, which occurs in the audible frequency range, to the peak PL occurring at the lower (infrasound) frequency. Whatever weighting will be agreed upon for infrasound, some characteristic frequency can be established as an input for the designing and dimensioning procedures of the invention.

In general, extending the silencing range down into the infrasound range calls for bigger chambers and longer connecting passages. As with silencers for conventional audible sound alone, the various measures of the present invention offer, also for infrasound attenuation, a better trade-off between the degree of attenuation, the pressure drop, and the space requirement for the silencer, as compared to conventional technique.

Depending on the particular circumstances, various combinations of parameters may be given as the basis of the design and dimensioning of a silencer.

The following combination of data can often be considered given for a substantially cylindrical silencer for the exhaust gasses from a piston engine (see FIG. 3):

| | |
|---|---|
| SDB (dB) | = Total sound attenuation (damping) requirement. |
| SDP (mm WG) | = Total pressure loss allowable across the silencer |
| $f_{ign}$ (Hz) | = Ignition frequency or firing frequency for the engine. |
| øD (mm) | = Desired diameter of the outer casing corresponding to an area A (mm$^2$) |
| ød (mm) | = Diameter of pipes corresponding to areas a (mm$^2$). |
| Q (m$^3$/s) | = Flow rate of exhaust gasses. |
| C (m/s) | = Sound velocity. |

The silencer 5 illustrated in FIG. 3 is substantially cylindrical and comprises an inlet pipe 6 leading exhaust gasses from a piston engine (not shown) into the silencer 5, an outer casing 7 and an outlet pipe 4 leading the silenced gasses out of the silencer 5 to the atmosphere.

The interior space defined by the outer casing 7 is subdivided into three chambers 1, 2 and 3 having axial lengths $L_1$, $L_2$ and $L_3$, respectively, by means of partitions 8 and 9.

A radial diffuser 10 with an outlet 10a is arranged as the outlet of an inlet passage (pipe) 11 to the first chamber 1. An axial diffuser 12 (i.e. a passage of a type characteristically different from the radial diffuser 10) consisting of a series of pipes 12 having an axial length $L_{12}$ approx. equal to 0.5 times $L_2$ and having outlets 12a with increasing diameter in the flow direction constitutes the passage from chamber 1 to chamber 2. A radial diffuser 13 with outlet 13a is arranged as the outlet of a passage (pipe) 14 having a length $L_{23}$ approx. equal to 0.5 times $L_3$ and leading from chamber 2 to chamber 3.

Sound damping material B such as mineral wool is arranged in the chambers adjacent to the pipes 11, 12 and 13.

SDB is often arrived at by means of a separate, conventional acoustic calculation based on the measured unattenuated noise at a certain distance from the outlet from the exhaust system correlated with a desired maximum noise level at another point in space.

$f_{char}$, which is often identical to $f_{ign}$ in the case of a piston engine, is determined by the rpm of the engine, the number of cylinders and the type of engine process (two-stroke or four-stroke). If the engine is coupled to the general power grid by means of a generator, the rpm will be given thereby. During start-up of such engines or in propulsion engines for ships, road vehicles and so on, the rpm is variable, and therefore the value of $f_{ign}$ in such cases must be estimated suitably low based on a rough estimate or on more detailed considerations, for instance based on acoustic-statistical calculations.

In some cases in connection with V-type cylinder arrangements, a frequency around half the value of the ignition frequency may be preponderant which may motivate utilizing this frequency as a basic parameter for the dimensioning and design according to the invention of the respective silencer according to the invention.

Q and c can be calculated from the given mass flow and temperature of the exhaust gasses.

SDP and øD are typically "semi-fixed" parameters. Often it is very desirable to limit each of them to a maximum value, but if SDB is already fixed then SDP and øD may not be determined freely. The bigger øD is chosen, the larger the sound attenuation will be. Therefore, it will often be a question of combining the design and dimensioning of the silencer with considerations regarding the interrelationship between silencing and øD including individually adapting the silencer structure to the geometrical constraints given by erection requirements, available space etc.

A typical procedure when carrying out the method of designing and/or dimensioning according to the invention is:

The number of chambers in the silencer is determined as $$n=|SDB/12.5 \text{ dB}|$$

For instance: n=|40/12.5|=3.

Hereafter, the types of intermediate pipes (passages) and of diffusers are decided. A combination of different types may be chosen for maximum repression of chamber resonances. So as to further hinder or avoid resonances, rather different chamber lengths $L_1$–$L_3$ may be chosen. The outlets 10a, 12a and 13a of the diffusers 10, 12 and 13, respectively, are located at or near the axial centre of the respective chambers and at or near ⅔ of the radius corresponding to the pressure nodes of the respective chambers.

The relation A/a of the cross sectional areas may be tentatively chosen to be 10.

Typically, different chamber lengths are chosen, for instance:

$$L_1=0.6L_3 \text{ and } L_2=0.8L_3.$$

Consideration of the local natural frequency for the system:

The two last chambers 2 and 3 with associated pipes 12 and 14, respectively, are dimensioned such that:

$$f_{23}=0.5f_{ign}$$

as $A/a=10$ so that $D/d_3=\sqrt{10}$ and therefore:

$$f_{23} = \frac{c}{2\pi} \frac{1}{\sqrt{10}} \frac{1}{\sqrt{0.5}} \sqrt{\left(\frac{1}{0.8}+1\right)} \frac{1}{L_3}$$

from which $L_3$ is determined. $L_1$ and $L_2$ are determined from this so that the total length of the silencer 5 is determined.

The other cross sectional areas of the connecting tubes 12 and 11 are determined such that the relations between the corresponding areas A and a are also approximately 10, the area a for the pipes 12 being the total cross sectional area of the pipes 12.

Now the total sound attenuation may be calculated as the sum of all ΔdB according to equation (2).

The total pressure loss may now be calculated by using a combination of known elementary formulas and a detailed knowledge of the efficiency of different diffuser types, consideration being given to the inlet flow profiles to the diffusers, the chosen detailed geometry and so on.

If one or more of the calculated values for $f_e$, degree of silencing or pressure drop differ from the desired values then one or more of φD, φd or L are adjusted and the calculations indicated above are repeated.

In cases where maximum compliance of a silencer with the given requirements is desired, the dimensioning indicated above is supplemented by an adjustment so that the "peaks" and "troughs" are adapted to the requirements. This is done by varying the dimensions (chamber lengths etc.) and calculating the damping spectrum by means of impedance analysis and constants involved herein, the constants being determined by separate theoretical and empirical investigations.

Referring now to FIG. 4, a practical example of designing and dimensioning a silencer for a six-cylinder, four stroke engine is illustrated.

The parameters of interest are given at the top of Table I, it being furthermore given that the total sound attenuation SDB desired is 35 dB.

TABLE I

| 220 HP at 1800 rpm | | Firing frequency 90 Hz | |
|---|---|---|---|
| 6 cylinders in R-form | | 4 stroke | Natural aspiration |
| 475 mmWG max. allowable backpressure | | | |
| Exhaust gas massflow | 227 g/s | | 0.477793 m3/s |
| Exhaust gas temperature | 470° Celcius | | |
| Density | 0.475101 kg/m3 | | |
| Sound vel | 546.5786 m/s | | |
| | 1.031818 g/s/HP | | |

| Drum diameter | 250 mm | Drum length | 2600 mm |
|---|---|---|---|
| | | Drum thickness | 2 mm |

| Chamber # | 0 | 1 | 2 | 3 | 0 | Total |
|---|---|---|---|---|---|---|
| Length [mm] | | 867 | 867 | 867 | 867 | |
| Stud diameter [mm] | 114.3 | 114.3 | 114.3 | 114.3 | 114.3 | |
| Stud thickness [mm] | 2 | 2 | 2 | 2 | 2 | |
| Velocity in [m/s] | 50 | 50 | 50 | 50 | 50 | |
| dyn press in [mmWG] | 60.6 | 60.6 | 60.6 | 60.6 | 60.6 | |
| Diffusor data | | | | | | |
| R1 [mm] | | 23 | 23 | 23 | | |
| R2 [mm] | | 108 | 108 | 108 | | |
| S [mm] | | 25 | 25 | 25 | | |
| Outer diameter [mm] | | 197 | 197 | 197 | | |
| Area out [mm2] | | 14283 | 14283 | 14283 | | |
| Area in [mm2] | | 9555 | 9555 | 9555 | | |
| Area ratio | | 1.49 | 1.49 | 1.49 | | |
| Zeta diffusor | | −0.23 | −0.23 | −0.23 | | |
| Zeta inlet | 0 | 0.05 | 1.05 | 1.05 | 1.05 | 1.05 |
| Press drop [mmWG] | 0 | −11 | 49.5 | 49.5 | 63.6 | 151.7 |
| dB | 0 | 4.4 | 8.7 | 8.7 | 4.4 | 26.1 |
| local frequency [Hz] | | | 90 | 90 | 45 | |
| % F ignition | 50 | | | | | |

The length of the drum (outer casing) is ideally desired to be 2600 mm but may be slightly larger if necessary.

The stud diameter minus stud thickness gives the internal diameter of the passage tubes and thereby the areas a. The drum diameter minus the drum thickness gives the area A.

In the initial calculation step, Table I, the number of chambers is chosen to be three and the chamber lengths are chosen equal, as are the pipe diameters (areas a). The tail pipe (outlet from the drum) is also involved in the dimensioning, the volume of the "chamber" constituted by the atmosphere being infinite. The length of the tail pipe is initially equal to the lengths of the other passage pipes.

The static pressure drop across a diffuser is negative and may be calculated as:

$$p_1 - p_2 = -\eta_d \tfrac{1}{2}\rho v_1^2,$$

$v_1$ being the mean flow velocity in the inlet passage to a chamber, and $\eta_d$ being a diffuser efficiency of a value which is fluid-dynamically proper way and not being excessively long, such as, e.g., the chambers of the device of FIG. 4, the pressure drop within the chamber is approximately zero, i.e.:

$$p_2 - p_3 = 0,$$

p2 and p3 being the static pressure at the locations indicated in FIG. 4.

From the chamber inlet to the outlet passage the static pressure drop is:

$$p_3 - p_4 = (1 + k_e)\tfrac{1}{2}\rho v_2^2,$$

$p_3$ and $p_4$ being the static pressure at the locations indicated in FIG. 4, $k_e$ being a constant, the value of $k_e$ typically being 0.1 when the transition to the inlet of the passage(s) leading gas from the chamber is rounded off.

Pressure drops in passages of arbitrary cross section form may be calculated as:

$$p_4 - p_5 = \lambda \frac{L}{4\frac{a}{p}} \frac{1}{2} \rho v_2^2,$$

$p_4$ and $p_5$ being the static pressure at the locations indicated in FIG. 4, a being the cross-sectional area of the passage at a representative position and P being the perimeter of the passage at the same position. For a circular pipe (as in FIG. 4), the denominator becomes the diameter. λ depends on the pipe surface roughness and Reynolds number; a typical value is 0.02.

For various types of diffusers, pipe roughnesses, etc. appropriate values of the constants can be found in handbooks of flow dynamics.

The total pressure drop is calculated as 151.66 mmWG, i.e. well below the maximum back pressure of 475 mmWG allowable for the engine. The total sound attenuation is 26.13 dB, i.e. too small. The local natural frequency of the chamber system 1–2 and the chamber system 2–3 is too high, as it should be much nearer half the firing frequency, i.e. 45 Hz.

In Table II, the diameters of the tubes between chambers 1 and 2 and between chambers 2 and 3 are reduced by the same amount so as to increase the sound attenuation and lower the natural frequency of the two said chamber systems in accordance with the expressions for ΔdB and $f_e$.

TABLE II

| Chamber # | 0 | 1 | 2 | 3 | 0 | Total |
|---|---|---|---|---|---|---|
| Length [mm] | | 867 | 867 | 867 | 867 | |
| Stud diameter [mm] | 114.3 | 114.3 | 70 | 70 | 114.3 | |
| Stud thickness [mm] | 2 | 2 | 2 | 2 | 2 | |
| Velocity in [m/s] | 50 | 50 | 139.7 | 139.7 | 50 | |
| dyn press in [mmWG] | 60.6 | 60.6 | 472.5 | 472.5 | 60.6 | |
| Diffusor data | | | | | | |
| R1 [mm] | | 23 | 13 | 13 | | |
| R2 [mm] | | 108 | 64 | 64 | | |
| S [mm] | | 25 | 15 | 15 | | |
| Outer diameter [mm] | | 197 | 197 | 197 | | |
| Area out [mm2] | | 14283 | 8779 | 8779 | | |
| Area in [mm2] | | 9555 | 3421 | 3421 | | |
| Area ratio | | 1.49 | 2.57 | 2.57 | | |
| Zeta diffusor | | −0.23 | −0.47 | −0.47 | | |
| Zeta inlet | 0 | 0.05 | 1.05 | 1.05 | 1.05 | |
| Press drop [mmWG] | 0 | −11 | 274.7 | 274.7 | 63.6 | 602 |
| dB | 0 | 4.4 | 14.3 | 14.3 | 4.4 | 37.3 |
| local frequency [Hz] | | | 53.9 | 53.9 | 45 | |
| % F ignition | 50 | | | | | |

The sound attenuation is now 37.28 dB and the natural frequencies of the two chamber systems are much closer to 45 Hz and are in fact acceptable, but the pressure drop of 602.04 mmWG is too high.

In Table III the diameter of the second and third pipes is increased by different values, while the diameter of the first pipe leading from the inlet of the silencer into the first chamber is decreased, resulting in a reduced pressure drop.

TABLE III

| Chamber # | 0 | 1 | 2 | 3 | 0 | Total |
|---|---|---|---|---|---|---|
| Length [mm] | | 867 | 867 | 867 | 867 | |
| Stud diameter [mm] | 114.3 | 88.9 | 88.9 | 76.1 | 114.3 | |
| Stud thickness [mm] | 2 | 2 | 2 | 2 | 2 | |
| Velocity in [m/s] | 50 | 84.4 | 84.4 | 117 | 50 | |
| dyn press in [mmWG] | 60.6 | 172.5 | 172.5 | 331.7 | 60.6 | |
| Diffusor data | | | | | | |
| R1 [mm] | | 17 | 17 | 14 | | |
| R2 [mm] | | 83 | 83 | 70 | | |
| S [mm] | | 19 | 19 | 16 | | |
| Outer diameter [mm] | | 197 | 197 | 197 | | |
| Area out [mm2] | | 11165 | 11165 | 9555 | | |
| Area in [mm] | | 5661 | 5661 | 4083 | | |
| Area ratio | | 1.97 | 1.97 | 2.34 | | |
| Zeta diffusor | | −0.38 | −0.38 | −0.44 | | |
| Zeta inlet | 0 | 0.05 | 1.05 | 1.05 | 1.05 | |
| Press drop [mmWG] | 0 | 54.3 | 114.9 | 201.1 | 63.6 | 433.8 |
| dB | 1.420848 | 5.8 | 11.6 | 13.3 | 4.4 | 36.4 |
| local frequency [Hz] | | | 69.3 | 58.8 | 45 | |
| % F ignition | 50 | | | | | |

The sound attenuation is still high enough (36.43 dB) and the pressure drop is low enough (433.80 mm WG), but the local frequencies of the chamber systems are too high to satisfactorily attenuate the firing frequency of the engine, i.e. too far above 45 Hz.

TABLE IV

| Chamber # | 0 | 1 | 2 | 3 | 0 | Total |
|---|---|---|---|---|---|---|
| Length [mm] | | 600 | 1225 | 775 | 969 | |
| Stud diameter [mm] | 114.3 | 88.9 | 88.9 | 76.1 | 114.3 | |
| Stud | 2 | 2 | 2 | 2 | 2 | |

TABLE IV-continued

| Chamber # | 0 | 1 | 2 | 3 | 0 | Total |
|---|---|---|---|---|---|---|
| thickness [mm] | | | | | | |
| Velocity in [m/s] | 50 | 84.4 | 84.4 | 117 | 50 | |
| dyn press in [mm-WG] | 60.6 | 172.5 | 172.5 | 331.7 | 60.6 | |
| Diffusor data | | | | | | |
| R1 [mm] | | 17 | 17 | 14 | | |
| R2 [mm] | | 83 | 83 | 70 | | |
| S [mm] | | 19 | 19 | 16 | | |
| Outer diameter [mm] | | 197 | 197 | 197 | | |
| Area out [mm-2] | | 11165 | 11165 | 9555 | | |
| Area in [mm-2] | | 5661 | 5661 | 4083 | | |
| Area ratio | | 1.97 | 1.97 | 2.34 | | |
| Zeta diffusor | | −0.38 | −0.38 | −0.44 | | |
| Zeta inlet | 0 | 0.05 | 1.05 | 1.05 | 1.05 | |
| Press drop [mm-WG] | 0 | 54.3 | 114.9 | 201.1 | 63.6 | 433.8 |
| dB | 1.420848 | 5.8 | 11.6 | 13.3 | 4.4 | 36.4 |
| local frequency [Hz] | | | 60.4 | 59.4 | 45 | |
| % F ignition | 50 | | | | | |

In Table IV the lengths of the chambers 1–3 are changed as indicated, but as the resulting local natural frequencies of the chamber systems are still not satisfactory it is necessary to lengthen the drum by 300 mm to 2900 mm as shown in Table V.

TABLE V

| Chamber # | 0 | 1 | 2 | 3 | 0 | Total |
|---|---|---|---|---|---|---|
| Length [mm] | | 650 | 1400 | 850 | 884 | |
| Stud diameter [mm] | 114.3 | 88.9 | 88.9 | 76.1 | 114.3 | |
| Stud thickness [mm] | 2 | 2 | 2 | 2 | 2 | |
| Velocity in [m/s] | 50 | 84.4 | 84.4 | 117 | 50 | |
| dyn press in [mmWG] | 60.6 | 172.5 | 172.5 | 331.7 | 60.6 | |
| Diffusor data | | | | | | |
| R1 [mm] | | 17 | 17 | 14 | | |
| R2 [mm] | | 83 | 83 | 70 | | |
| S [mm] | | 19 | 19 | 16 | | |
| Outer diameter [mm] | | 197 | 197 | 197 | | |
| Area out [mm2] | | 11165 | 11165 | 9555 | | |
| Area in [mm2] | | 5661 | 5661 | 4083 | | |
| Area ratio | | 1.97 | 1.97 | 2.34 | | |
| Zeta diffusor | | −0.38 | −0.38 | −0.44 | | |
| Zeta inlet | 0 | 0.05 | 1.05 | 1.05 | 1.05 | |
| Press drop [mmWG] | 0 | 54.3 | 114.9 | 201.1 | 63.59463 | 433.8 |
| dB | 1.420848 | 5.8 | 11.6 | 13.3 | 4.4 | 36.4 |
| local frequency [Hz] | | | 53.9 | 53.8 | 45 | |
| % F ignition | 50 | | | | | |

Now the local frequencies are close enough to 45 Hz to give a satisfactory attenuation of the firing frequency of the engine.

Even though further optimization will be achievable such further improvement will be relatively small and without much practical value in the actual situation.

The example given above of an embodiment of a method according to the invention for designing and dimensioning a device for silencing a flow of exhaust gasses is directed to relatively simple and uncomplicated situations where the silencing, pressure loss and space constraints are not strict.

The passages between the chambers may be prolonged by several means either alone or in combination. The pipes may be prolonged backwards into the upstream chamber and forwards into the downstream chamber, or the pipes may be prolonged by adopting a helical design for same. If the pipes either alone or combined with a diffuser are prolonged both upstream and downstream, the outlet of the upstream pipe in a chamber may be downstream of the inlet of the downstream pipe, thereby twice reversing the direction of the main flow in said chamber. A diffuser having an umbrella-like shape with the convex surface thereof facing downstream will also have the effect of prolonging the passage and reversing the flow. Various types and shapes of baffle plates and guiding plates and bodies may be employed.

The design and dimensions of the diffusers are important for optimizing the pressure recovery thereof and thereby minimizing the pressure loss through the silencer. Each diffuser may be a radial diffuser or an axial diffuser or a circular conical diffuser or an annular diffuser or a multiplicity of conical diffusers arranged on a cylindrical surface or a diffuser for reversing the direction of flow or a double diversion diffuser or any other kind of diffuser.

All inlets of the passages should be suitably rounded so as to avoid vena contracta flow with associated vortices giving rise to pressure loss and noise that may be amplified in the passage by resonance.

The outlets of the diffusers should, if possible, be located at the centre of the longitudinal direction of the chamber relative to the main flow direction and/or at the pressure node of a transverse oscillation in the chamber. Hereby, the basic resonances of the chamber in the two directions is repressed.

The arrangement of any sound absorbing material in the silencer is important. Particularly in large silencers it should not be too thick or compact so as to not decrease the acoustic volume of the chambers.

Further embodiments of the invention rely on supplementing series connected acoustic filters by one or more side-branch chambers, acting as resonators, and in some cases being provided with built-in sound absorptive material.

Silencers relying solely on resonators are per se well-known from the prior art. A resonator can provide substantial attenuation around a selected center-frequency, which is determined by the dimensions of the device. However, a single resonator chamber cannot provide the broad-band attenuation achieved by devices according to the invention. In principle, many resonators with different center-frequencies can make up for this deficiency, but silencers of such a configuration become very bulky. An attractive feature of resonators is that they produce very little pressure loss, since the gas flow does not pass through them.

According to the invention, resonators are only used as supplements to achieve improved attenuation at and around selected frequencies which may need further attenuation after achieving otherwise good attenuation by adopting the series-type connection of acoustic filters according to the main principles of the invention.

As an example, an unattenuated sound spectrum of an engine exhaust may have, as previously described, a major peak at the ignition frequency, which can be efficiently dampened by the main method of the invention. But at twice this frequency a smaller peak may also be present, which can be targeted by a side-branch connected resonator.

Sometimes a combination of geometric restrictions for the silencing arrangement can be such that addition of a resonator according to the invention represents good economy with both available space and with pressure drop in the exhaust. For example, a tail pipe 3, leading gas from a silencer, may be prescribed to be positioned at a certain distance WD from a wall, as shown in FIG. 10a. A resonator 4 is here shown to be arranged as an appendix to a main silencer 1, i.e. as a separate container connected to a last chamber 2 of the main silencer 1 by means of a connecting pipe 5.

The resonator can be an empty chamber or contain a movable piston 6, as shown in FIG. 10a. In the first case the center frequency of the resonator will be fixed. In the second case the center frequency can be selected freely within a variation band, by moving the piston, whereby the attenuation spectrum can be optimized. This last facility can be convenient if the exact sound spectrum of the engine is not known, as often the case in practice, when engines and silencers are manufactured by different suppliers.

FIG. 10b shows an alternative embodiment of the invention, in which the resonator has been arranged as a direct extension of the last chamber of the main silencer. In this case, sound absorptive material Ba (e.g. basaltic mineral wool) has been inserted into the resonator.

The theory of resonators is well-known in acoustics and will therefore not be referred here, except for some main characteristics, as a guide for applying resonators according to the invention:

When the resonator is connected to the main silencer by means of pipe, as in FIG. 10a, the peak in the added attenuation spectrum will be more narrow and sharp, as compared to a configuration in which there is a direct connection without a 'neck', as shown in FIG. 10b. In the first case the center frequency is determined as the so-called Helmholz frequency, well-known in acoustics. When calculating this frequency, the acoustic 'stiffness' of the last chamber of the main silencer should be added to the acoustic stiffness of the resonator chamber. The resulting Helmholz frequency thus becomes higher than as given by the resonator itself. Acoustic wave phenomena within the resonance chamber will also influence the Helmholz frequency and should be taken into account in an accurate calculation. The center frequency of a resonator without a connecting pipe is approximately equal to the frequency corresponding to a quarter of a wavelength which is equal to the length of the full chamber.

According to the invention, resonators can also be built into the main silencer as an integrated feature of a chamber. FIG. 7, discussed in greater detail below, shows an example of this. Here, a cylindrical cavity 70 contained within the inner cylinder of the annular passage functions as a resonator, providing added attenuation with a center frequency which is approximately equal to the frequency corresponding to a quarter of a wavelength which is equal to the length of the cylindrical cavity.

FIG. 6 shows a preferred embodiment of a device according to the invention. Here, two chambers 1 and 2 are contained within a casing 7 and are separated by partition walls 8a and 8b. An inlet passage or pipe 6 passes the flow to a first chamber 1 via a radial diffuser 10. From a second chamber 2 the flow is passed to the outlet passage pipe 4 via an opening provided with a curvature 22 preventing flow separation.

The two chambers 1 and 2 are interconnected by an annular passage 12. The combination of the radial inlet diffuser and the annular passage as illustrated in FIG. 6 effectively prevents sound waves from 'short cutting' chamber 1 when passing from the inlet passage 6 to the annular passage 12, even though the distance D1 between the inlet to the annular passage 12 and the inlet to the first chamber 1 is relatively short. I.e., sound energy effectively fills the first chamber 1. The flow path from the inlet to the outlet of the second chamber 2 provides relatively small changes of flow direction. However, due to the relatively long distance D2, the tendency for sound waves to 'shortcut' the second chamber is rather small.

The inlet 12a to the annular passage 12 contains several features which contribute to make the inlet smooth so as to prevent pressure-loss associated vena contracta phenomena: Both of two cylinders 42 and 44 are extended by design parts into the first chamber 1, thus providing guidance for the flow accelerating into the annular passage 12. The inner cylinder 42 is extended to the left by a cylinder 41 which is non-perforated immediately upstream of the inlet to the annular passage 12, and which is perforated elsewhere and contains sound absorptive material Ba. The outer cylindrical 44 is extended to the left by a conical cylinder 21, the extension providing a a curvature 20 between the cylinder 21 and the cylinder 44. The outermost diameter of the conical cylinder 21 is large enough to provide sufficient guidance for the flow, i.e. the flow velocity at this diameter is much smaller than the flow velocity in the annular passage. However, the distance D3 between the conical cylinder 21 and the casing 7 is not unnecessarily small, since this would tend to acoustically isolate the right-hand, annular part of chamber 1.

An outlet 12d from an annular diffuser 12c passes the flow into an annular passage 30 inside the chamber 2, constituted by an inner, perforated cylinder 43 and an outer, likewise perforated cylinder 46. Sound absorptive materials Bd and Bc are placed inside the cylinder 43 and outside the cylinder 46, respectively. The width D4 of the passage 30 is chosen as a compromise between opposing demands: On the one hand, the smaller the size of D4 is, the more efficient sound absorption is achieved. On the other hand, D4 should not become so small that strong, turbulent noise is generated, or so small that strong fluid-mechanical forces, tending to abstract absorptive material, are generated. Annular flow between sound absorbing walls is per se known as an acoustically efficient configuration.

The length $L_{12}$ of the connecting passage 12 is chosen to be long enough for the local natural frequency $f_e$ to become sufficiently low, as given by the method of the invention, cf. equation (1). When the total length of the casing 7 is given and is comparatively short, $L_{12}$ is chosen by balancing a number of demands: The distance D1 can be made rather small, e.g. in the order of half the diameter of the casing, depending upon a number of further geometric choices, among them the size of distance D3. Shortening distance D2 will cause a somewhat deteriorated acoustic function of chamber 2, but as a gradual function of D2. In general, it is desired that the level of the noise which may be generated due to turbulence should not, at any frequency, exceed the level of the noise created by the engine.

For a given length $L_{12}$, the annular passage type, the flow-friendly features of a smooth and guiding inlet and a diffuser outlet, allow for a comparatively low natural frequency $f_e$ and rather big, effective sound-reflective flow area ratios A/a, cf. equation (2).

From fluid-dynamic diffuser theory it is known that there exists a maximum angle α of divergence, indicated in FIG. 6, which, when exceeded, leads to flow separation inside the diffuser which is a non-optimal phenomenon which should be avoided. This maximum angle is relatively small, so that for a large outlet to inlet flow area ratio of the diffuser, the diffuser tends to become long. However, for given sizes of inlet and outlet cross-sectional areas, an annular diffuser allows for a shorter diffuser length than a conical diffuser. This means that, in an embodiment as shown in FIG. 6, even though a low flow velocity is desired at the outlet 12d, and a high flow velocity is desired in the constant flow area part 12b of the passage 12, the diffuser length $L_{12c}$ can be chosen rather short, without causing flow separation. For a given total length $L_{12}$, this in turn means that the constant flow area part length $L_{12b}$ can be made rather long, so as to obtain a rather long L in equation (1), and so as to thereby obtain a rather low natural frequency, $f_e$. The acoustically effective area a of the interconnecting passage 12 is a weighted mean of all cross-sectional areas occurring from the inlet 12a to the outlet 12d. Therefore, it is acoustically favourable that the passage with the smallest area, i.e. the cross-sectional area of the constant-area part 12b, is comparatively long.

The silencer embodiment shown in FIG. 6 contains a rather simple, central body 40 which is securely and accurately fixed to the outer parts of the silencer via a number of flow-aligned arms or sheets 47, 48, and 49. For example, in the radial diffuser 10 there may be four arms or sheets 49, positioned along the periphery of the diffuser at an angular spacing of 90°. The total interface area between empty chamber volumes and volumes filled with sound absorptive material is big, providing a maximum of sound absorptive effect to assist sound reduction due to reflection at changes in cross-sectional area.

In the embodiment shown in FIG. 6, the flow occurring in the annular passage 12 is coherent all around the periphery of the annularity, apart from the small interruptions provided by the arms or sheets 47 and 48. For manufacturing reasons it may be expedient to adopt various types of peripheral segmentations of the annular passage. Thus, the arms or sheets 47 and 48 may be substituted by deformations which may be formed by pressing operations made on inner parts 42 and 43 and/or on outer parts 44 and 45 constituting the annular passage 12.

In bigger silencers, or when extreme outlet and/or inlet flow cross-sectional area ratios are wanted for the annular diffuser, it may be advisable to adopt a thorough peripheral segmentation of the annular passage, so as to prevent fluid-mechanical instability of the rotating stall type, well-known from turbo machinery. This can be done by inserting radial partition walls into the annular passage. An alternative is to split the annular passage into a multiplicity of flow-parallel pipes arranged with the centerlines of all pipes situated on a cylinder with a centerline coinciding with the centerline of the silencer as such. These pipes can be circular, in which case diffusing outlet parts will be conical diffusers. Many other cross-sectional shapes of pipes are also possible, e.g. squared cross-sections.

FIG. 7 shows another preferred embodiment of a device according to the invention. As in FIG. 6, an annular passage 12 connects two chambers 1 and 2. In FIG. 7, the casing is more elongated, the embodiment of FIG. 7 thus representing a typical vertical silencer for trucks, wherein the casing is rather long, and wherein the diameter of the casing is rather small.

The following differences compared to the embodiment of FIG. 6 are notable:

The distance $D_3$ has vanished, so that the conical cylinder 21 provides the partition wall 8b between the chambers 1 and 2, together with the rounded part 20 and central parts of the silencer. Still, the annular spacing 32 is not 'wasted' as an acoustic volume of the silencer, since it is a part of the chamber 2. Perforated cylinders 41 and 50 provide inner delimiters of the annular spaces 31 and 30, respectively. Whereas in FIG. 6, the annular space 30 is delimited by both the inner and the outer perforated cylinders 43 and 46, annular spaces 30 and 31 in FIG. 7 are outwardly delimited by the casing 7. Arms or sheets 51, 52, and 53 help fix cylinders 41 and 50, together with filled-in sound absorptive materials Ba and Bd. Whereas in FIG. 6, the outflow from the annular passage 12 passes directly into the passage 30, the outflow in FIG. 7 passes a short distance D5 before entering the annular passage 30.

A cylindrical cavity 70 acts as a built-in resonator, as explained below.

FIGS. 8a–8e show a preferred embodiment of the invention in which a helical passage 12 connects two chambers 1 and 2, contained within a cylindrical casing 7 and separated by an inner, flat partition wall 8. The helical passage is delimited by casing 7, by an inner cylinder 42, and by helically formed sheets 60 and 61. The helical passage 12 is subdivided into a constant flow-area part 12b and a diffuser part 12c, in which the flow area gradually widens in the gas flow direction, as given by a gradually widening distance between the sheets 60 and 61.

Both chambers 1 and 2 are partly filled with sound absorption material Ba, contained behind perforated plates 41 and 43. These plates are so formed and positioned that, together with the absorptive material, they help guide the flow inside the chambers 1 and 2 with low pressure drop while preventing unwanted flow swirling inside the chambers.

Gas flow is led to the silencer via an inlet pipe 6 and a conical diffuser 10, which recovers dynamic pressure and further helps to prevent unwanted swirl inside the chamber 1 by lowering the inlet flow velocity to the chamber. Here, the flow generally turns 90 degrees before entering the helical connecting passage 12 at 12a. Here, a cylindrical rod 21 has been fitted onto the inner cylinder 42 in order to improve inlet flow conditions, preventing vena contracta phenomena and inlet pressure losses. Inside the passage 12, the flow first passes the constant flow area part 12b and then the diffuser part 12c in which dynamic pressure is recovered. The flow leaves the passage 12 at the outlet 12d where it enters the chamber 2. Inside the second chamber 2, the general flow direction turns 90 degrees, both in plane AA and in plane CC, before entering an outlet pipe 4.

From the flow inlet 12a to the flow outlet 12d of the helical passage 12, the flow in total turns 360 degrees inside the silencer casing. Thus, the length of the passage is approximately π times the casing diameter, contributing to a very low acoustical natural frequency $f_e$, constituted by the passage 12 and the chambers 1 and 2. In FIG. 8, the length of the casing 7 is only slightly in excess of the diameter. The embodiment thus demonstrates how, by adopting a helical passage between chambers according to the invention, it has become possible to achieve a much lower natural frequency than with a straight passage.

Examples of particularly relevant applications of the embodiment of FIG. 8 are silencers for buses or trucks where there is space for a rather big silencer volume, given by a casing of a rather big diameter but of a short length.

Even though the flow turns considerably inside the casing, the associated pressure loss is remarkably low. In spite of the embodiment being truly three-dimensional, the essentially 1-dimensional dimensioning method of the invention applies.

Naturally, an accurate description of the fluid-flow and acoustic properties of the silencer should be three-dimensional. However, this is also the case in silencers wherein the acoustic field and the flow field is substantially two-dimensional. It should also be pointed out that, in spite of the three-dimensional flow path through the embodiment of FIG. 8, the device can be manufactured by rather simple members and by simple methods like sheet pressing, rolling, welding, etc.

Many types of silencers with helical flow patterns inside the casing are known from the prior art. However, in know silencer embodiments, helical flows have been desired for reasons differing from those of the present invention. Thus, for example, very efficient sound absorption has been achieved by adopting helical channels made by perforated cylinders in contact with absorptive material. Another reason for adopting helical internal flow in silencers has been to achieve a spark-arresting effect by increasing the residence time for exhaust gasses inside a silencer.

The helical configuration of the invention allows the engineer to select the length of the connecting channel 12 very freely and to optimize this length according to the method of the invention. Thus, when a very low natural frequency is desired, even substantially more than 360 degrees turning of the passage will be beneficial in some cases. An example of this could be a truck application, for which it is desired to attenuate infra-sound created by the engine when running at low speed at engine start-up or at hauling operation of the truck. Attenuation of infra-sound is further relevant in connection with gas turbine power stations. In other cases, less than 360 degrees flow turning in the helical passage can be appropriate, e.g. with higher ignition frequencies of engines, and when it becomes essential not to create too low resonant frequencies of the helical passage.

To the silencer design engineer, it is obvious that the goals addressed by the embodiment shown in FIG. 8 can be achieved by many variations in design configuration. As an example, the flow-widening of the diffuser 12c can be achieved by varying the diameter of the inner cylinder 42. A helical passage can be fitted into a cubic casing instead of into a cylindrical casing. The wall 8, separating the chamber 1 from the chamber 2, can be a cylinder, and the chamber 2 can be arranged essentially outside the chamber 1, which is favourable from a shell noise emission point of view, since the sound level inside the chamber 1 is higher than inside the downstream chamber 2.

FIGS. 9a and 9b show an embodiment of a device according to the invention in which a monolith, e.g. a catalyser, is built into a two-chamber silencer with a helical passage connecting the two chambers. The first chamber 1 is a flat, cylinder-like volume at the top of the silencer. The second chamber is divided into two parts 2a and 2b, the division being established by an annular monolith 100. Sound absorbing material, Ba, is contained within a central cylinder 42, a perforated top sheet 41, and a solid bottom plate 8. The helical passage 12 is delimited by a cylindrical silencer casing 7, by the top part of the cylinder 42, and by two helical sheets 60 and 61. Usually, a catalytical monolith has rather thin walls, in which case it only to a very limited extent causes an acoustical subdivision of the second chamber of the silencer. Thus, the sub-chamber 2a, the sub-chamber 2b, and the gas part (the porosities) of monolith 10 together constitute a single silencer chamber from an acoustical point of view. This second chamber is separated from the first chamber by the plate 8, by the cylinder 42, and by the walls of helical passage 12, i.e. sound can only pass from the chamber 1 to the second chamber via the passage 12.

Gas enters chamber 1 from an inlet pipe 6 and a diffuser 10 and turns approximately 90 degrees around the vertical silencer axis before entering the helical passage 12 at the inlet 12a thereof. At this inlet, a cylindrical rod 21 is fitted onto helical sheet 60 so as to prevent 'vena contracta' inlet flow.

Within the helical passage 12, the flow rotates slightly more than 360 degrees around the silencer axis while flowing slightly downwards before leaving the passage 12 at the outlet 12d where it passes into the chamber 2a. Here, the flow is distributed around the annular inlet face of the monolith, at the same time changing its direction from tangential to axial flow due to the axial flow channels within the monolith. After leaving the monolith, the direction of the flow becomes tangential in the chamber 2b, from which the flow leaves the silencer by a pipe 4.

FIGS. 11a–j illustrate a number of variations of helical and spiral passage forms and embodiments incorporating helical passages, being special cases of curved passages.

Figure 11F:
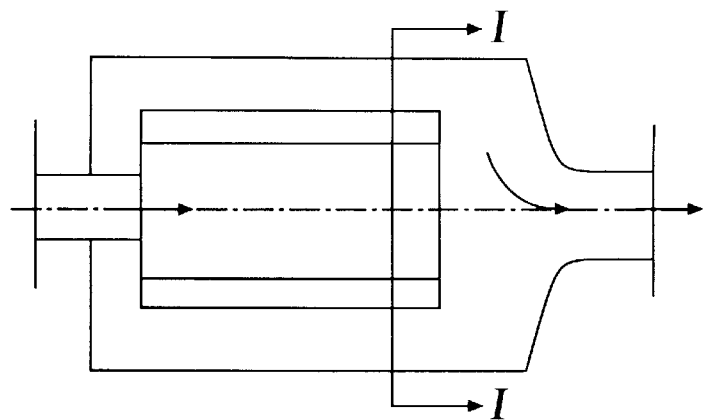
FIG. 11a shows a cross section of a cylindrical silencer with a tail pipe which is composed of a helical or spiral part and a short, straight part. The helical/spiral part is wound around the cylindrical casing.
FIG. 11b shows a screw-like helical generatrix form of a passage.
FIG. 11c shows a plane, spiral generatrix form of a passage.
FIG. 11d shows a conical, screw-like generatrix form for a passage, as an example of the winding radius varying along the longitudinal direction.
FIG. 11e shows a winding generatrix form for a passage, with an upstream part extending in one direction, and a downstream part extending in the opposite direction. This combination can be useful for a passage in a silencer for which the inlet and outlet passages of the silencer are placed at the same end of the casing.
Figure 11G:
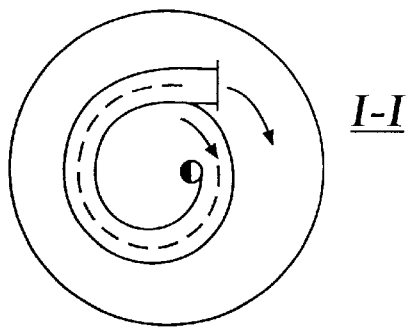

FIGS. 11f and 11g are sketches of an embodiment of a device according to the invention in which a first chamber is contained within a second chamber, the generatrix of the connecting passage being a plane spiral. In the drawing, the cross section of the passage is rather wide. Alternatively, the passage cross section (of area a) could be much more narrow, depending on the intended cross section area ratio A/a.

Figure 11H:
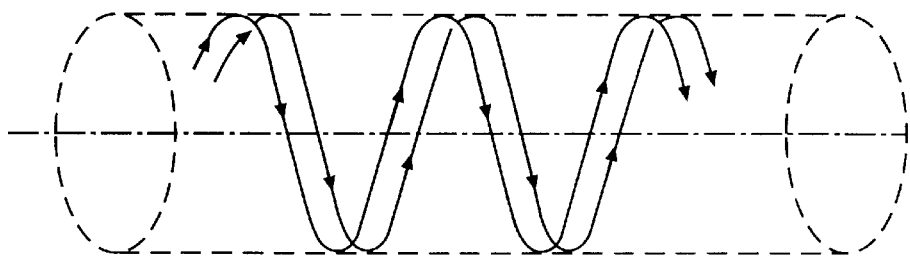

FIG. 11h shows two parallel, screw-like helical generatrix forms, which can be adopted for a helical passage being divided into two parallel passage parts.

Figure 11I:
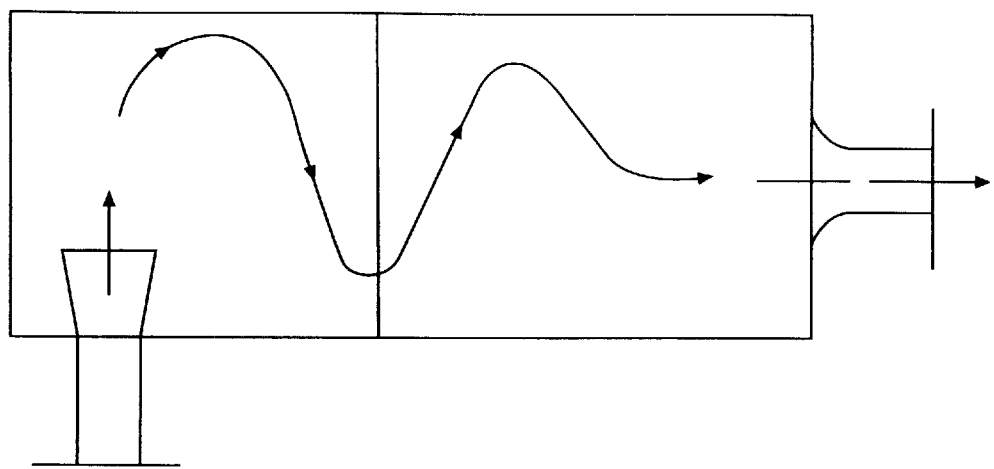

FIG. 11i illustrates how a curved passage form can be adopted, both for providing a prolonged passage, and for reducing the change of flow direction within a chamber. For example, this principle can be combined with a division into two or more parallel passages (as illustrated above), in case of an inlet passage being arranged sidewise onto a silencer casing of a rather small diameter. In this way, big pressure losses and swirl within the first chamber can be avoided.

Figure 9A:
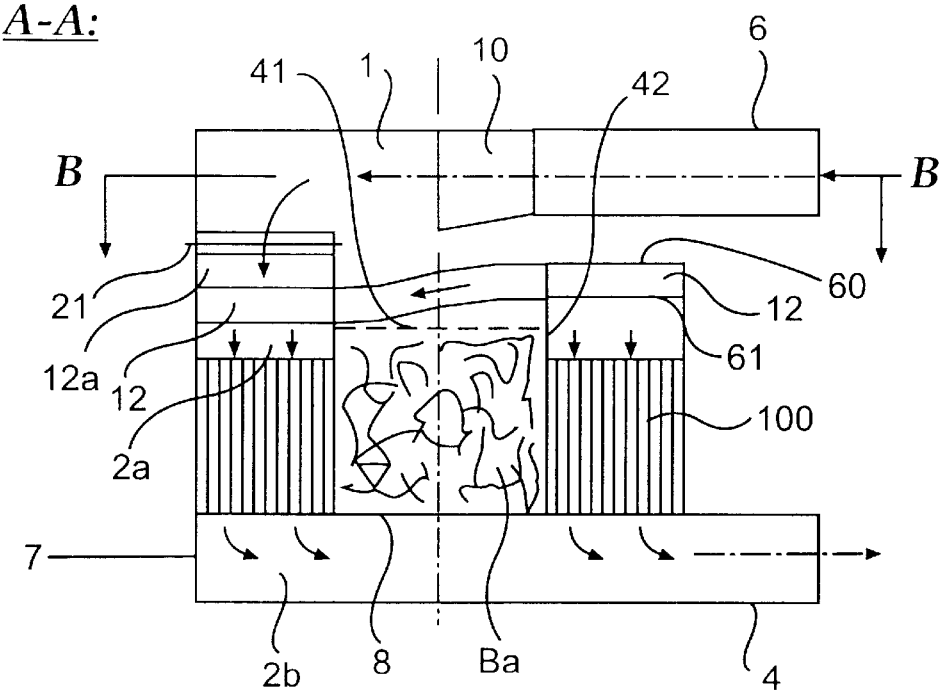
Figure 9B:
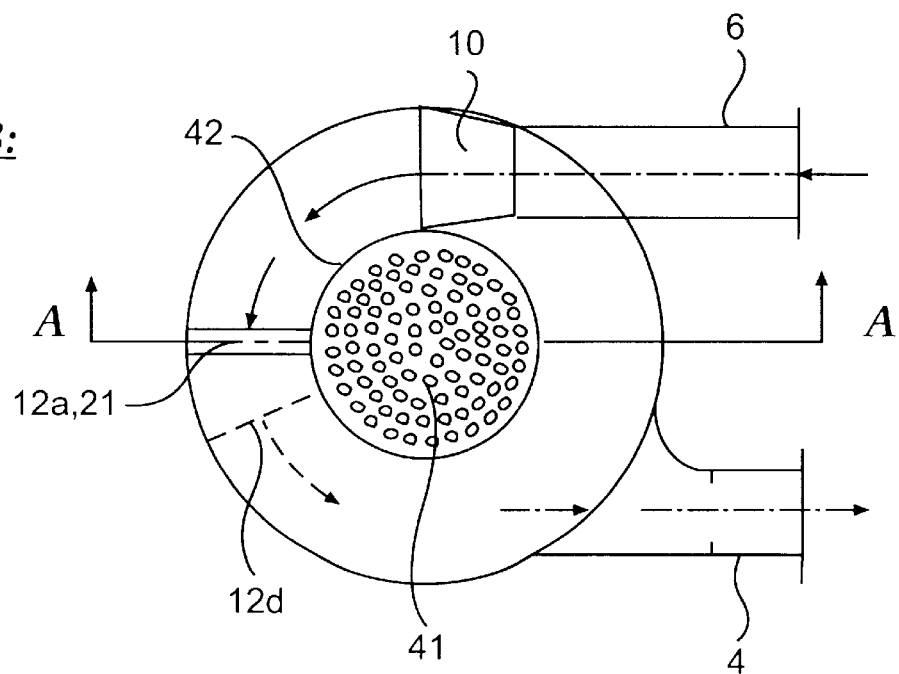
Figure 10A:
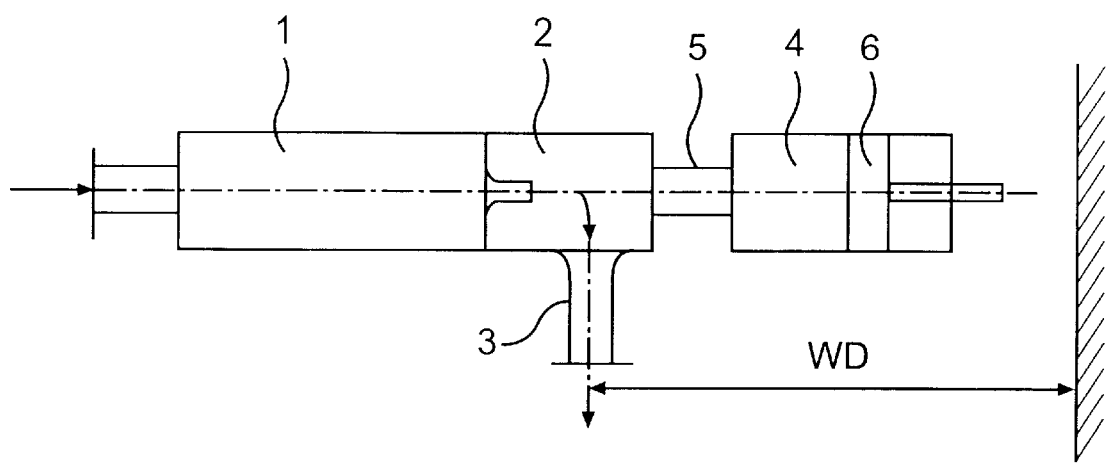
Figure 10B:
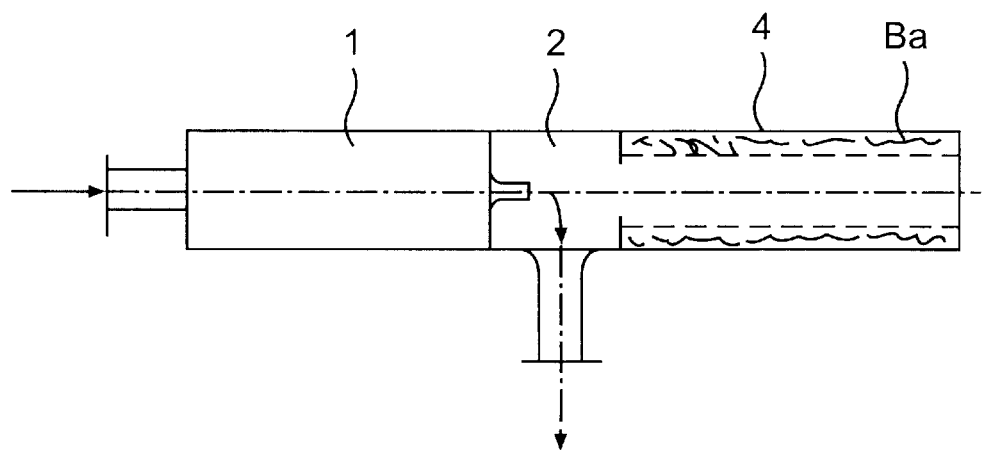
Figure 11J:
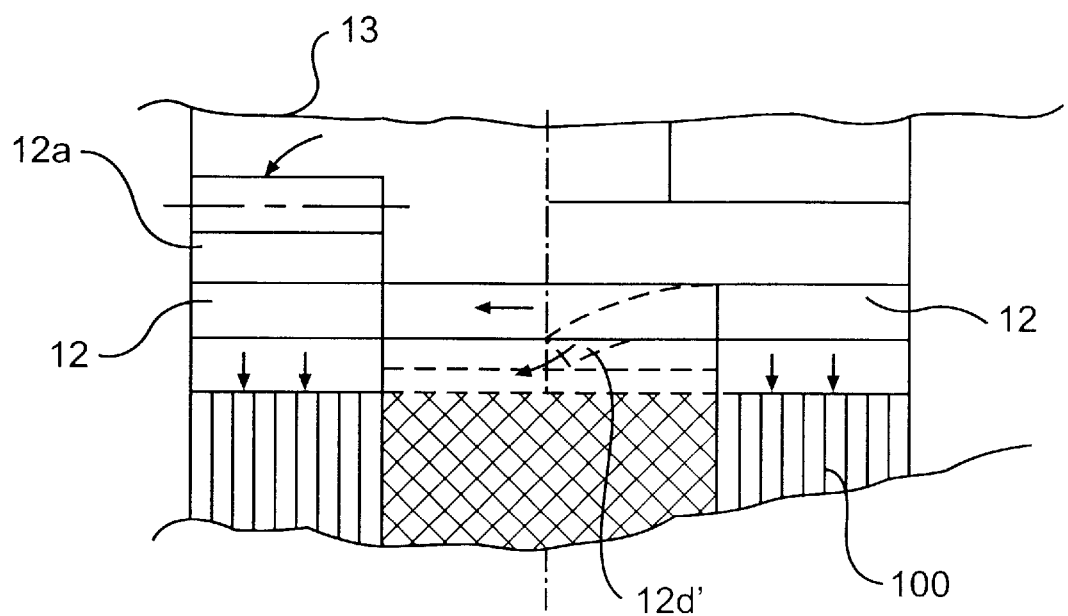

FIG. 11j shows a detail of an embodiment of the invention being a variation of the embodiment shown in FIG. 9. In addition to a helical passage outlet 12d, a secondary outlet 12d' has been added in FIG. 11j. Thus, part of the flow leaves the passage through the outlet 12d and the rest through the secondary outlet 12d'. Both flow parts leave the passage in a tangential direction within the annular spacing above the monolith 100. By adding the outlet 12d', the flow distribution to the face of the monolith can be improved. Further improvement in this respect can be achieved by adding further outlets to the passage.

As in the present embodiment demonstrates how a helical passage can be used to build in a long passage connecting two chambers of a rather short, cylindrical silencer. The tangential outflow at 12d ensures a very even flow distribution to the many, parallel channels of the monolith. Even though the total flow turning within the device is substantial, the pressure loss is rather small. The device is a very compact, flow-friendly silencer in which it has become possible to build in a monolith of a significant As in the preceding embodiment,volume.

The principles of the invention allow the engineer to adopt many forms of chambers and connecting passages, retaining efficient damping of all sound frequencies, and in particular it provides the engineer with tools for obtaining sufficient damping of low frequencies, even when the available space is narrow. Exhaust system layouts may, e.g., differ substantially from one truck or bus model to another. Sometimes a silencer is required to be of a relatively small outer diameter, but may be allowed to be rather long. In other cases other requirements may exist: The silencer can be allowed to be of a relatively large outer diameter while its length is restricted. Sometimes pipes leading exhaust gas to and from a silencer are required to enter or leave at opposite ends, sometimes at the same end of the silencer, sometimes in line with the silencer, sometimes at an angle, etc.

In many cases, silencers are required to be of a cylindrical design, since this form is rather easy to manufacture. But other forms may also be appropriate, e.g. elliptical, squared or conical forms.

Below some general design principles are outlined, which will provide engineers with tools for retaining optimal silencer performance complying with a broad array of geometric conditions. Following this, the general principles will then be exemplified by specific design cases. There will be two points of focus for optimal design and dimensioning: Chambers and connecting passages.

Figure 1:
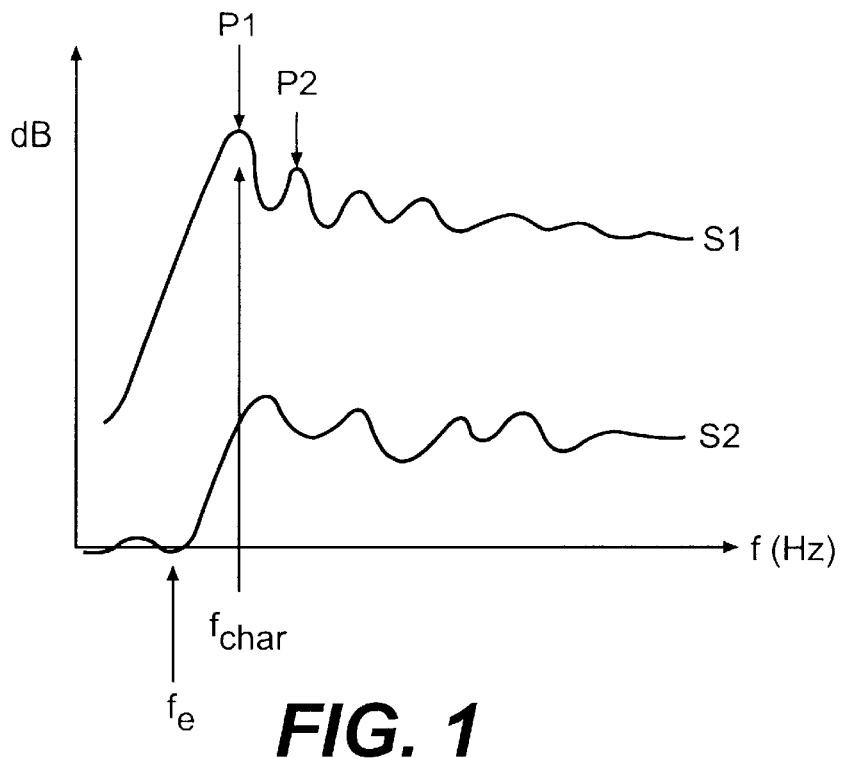
Figure 2:
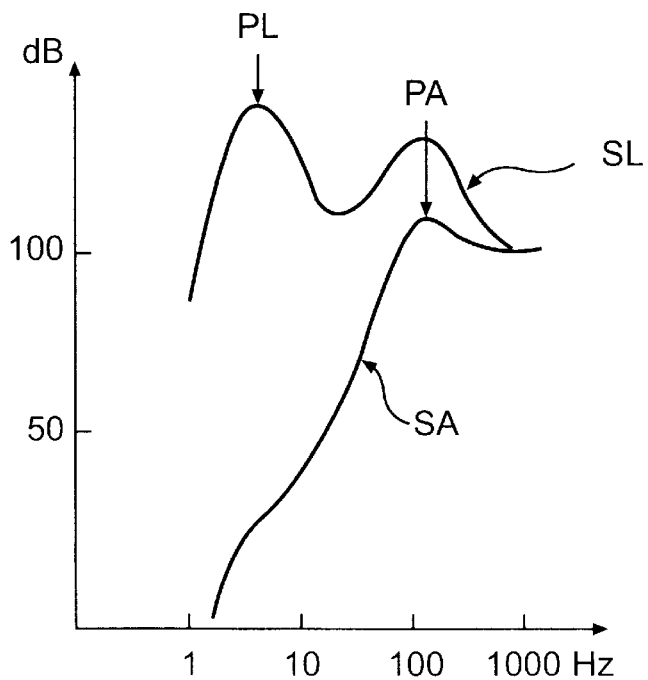
Figure 3A:
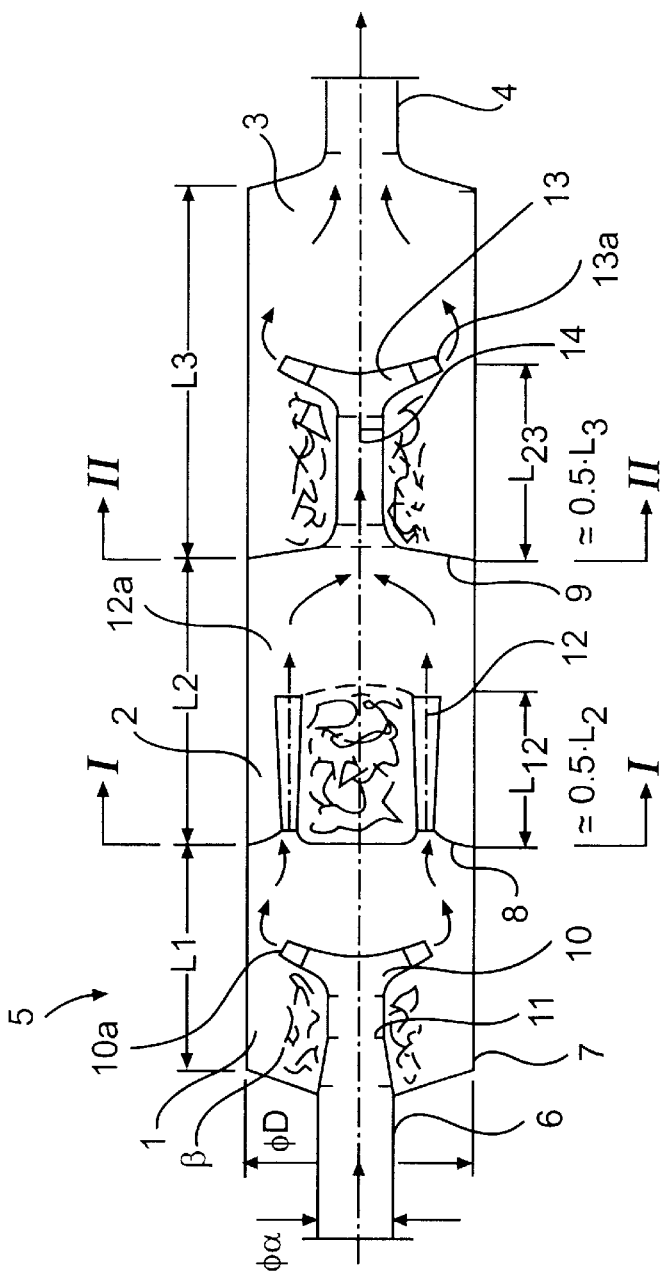
Figure 3C:
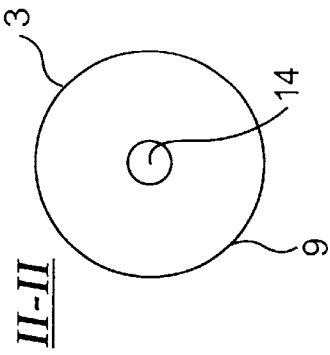
Figure 3B:
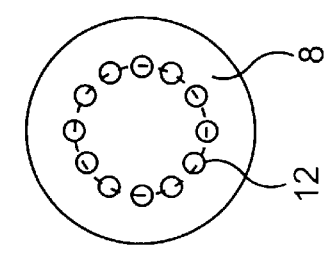
Figure 4:
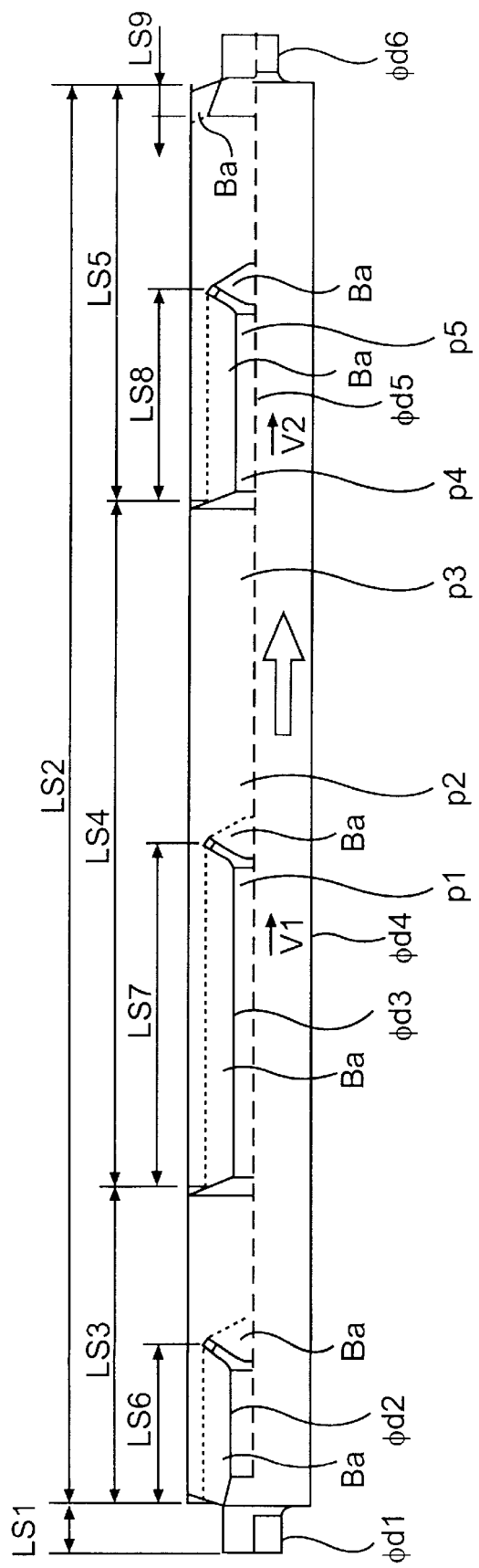
Figure 5:
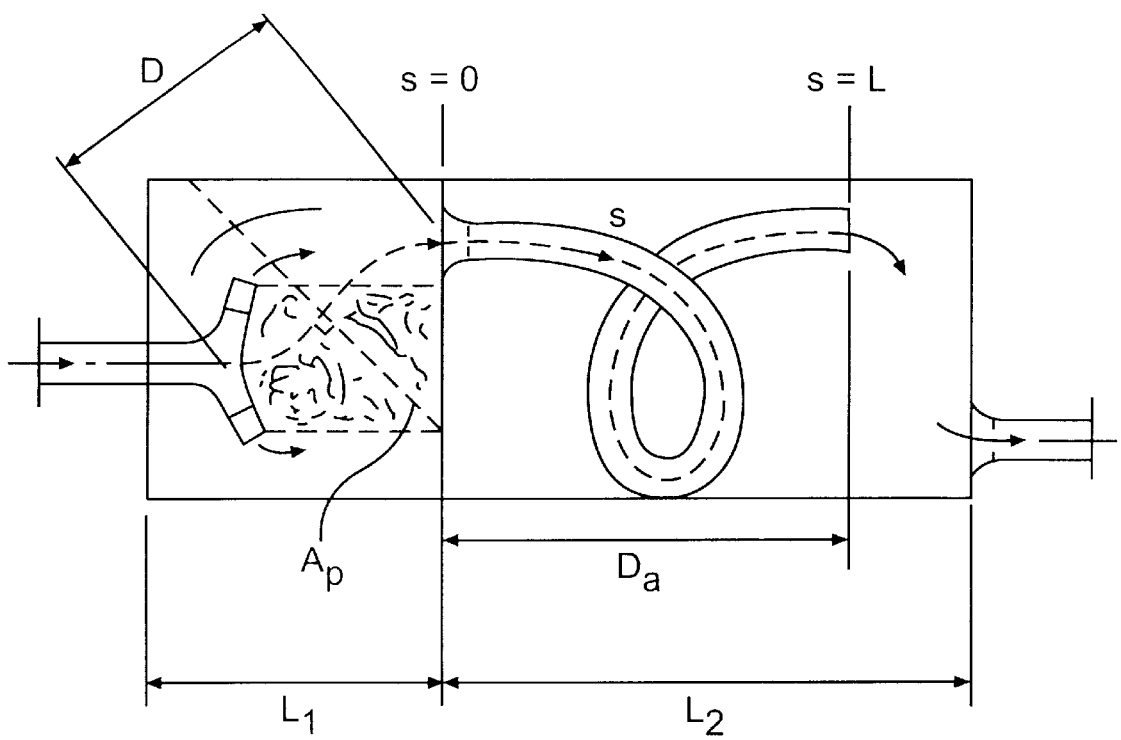
Figure 6:
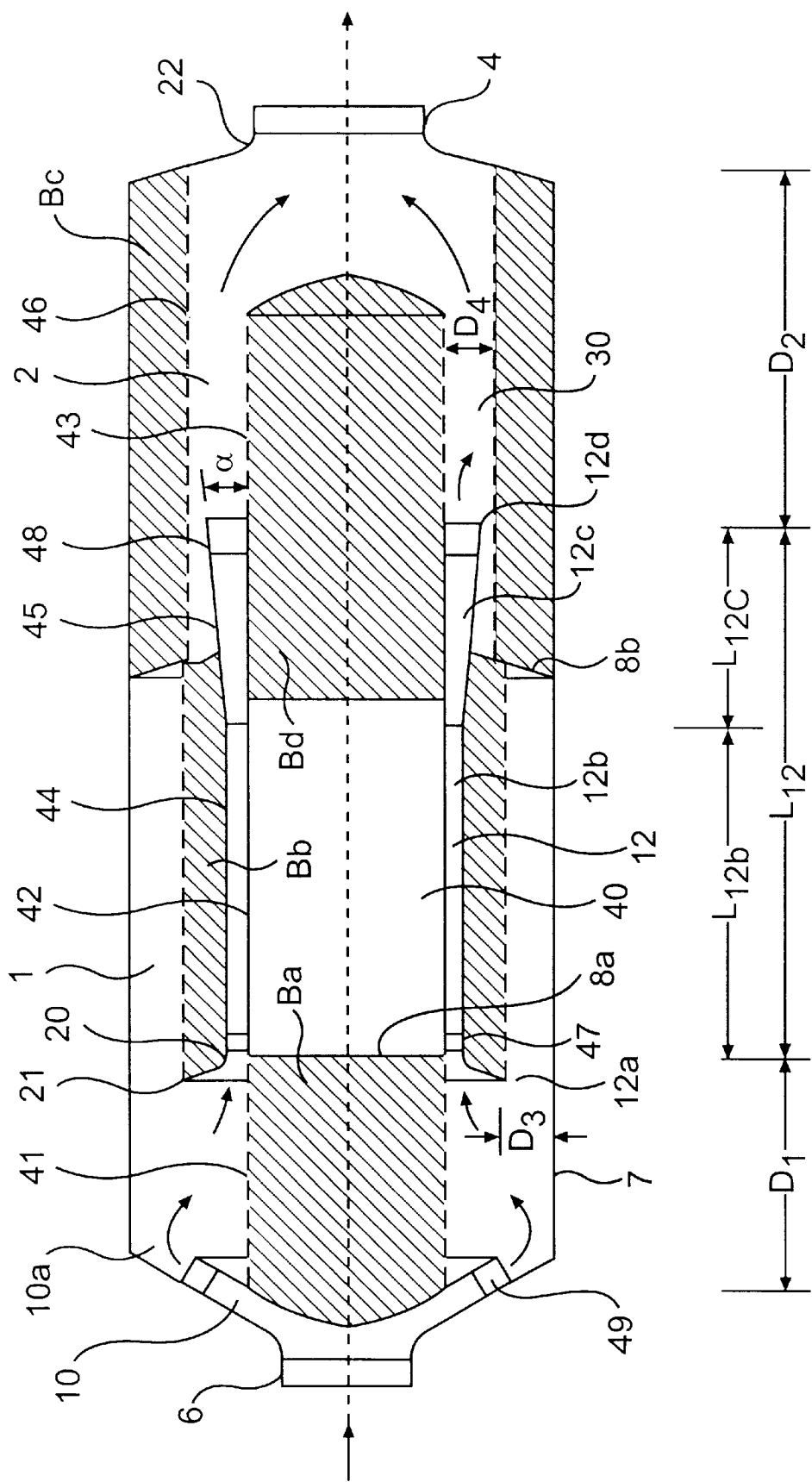
Figure 7:
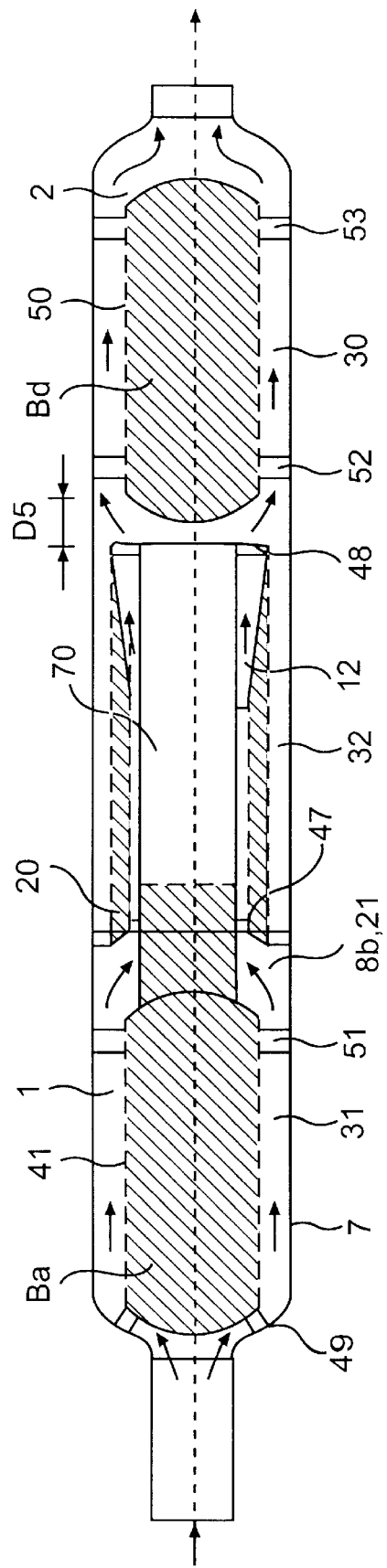
Figure 8B:
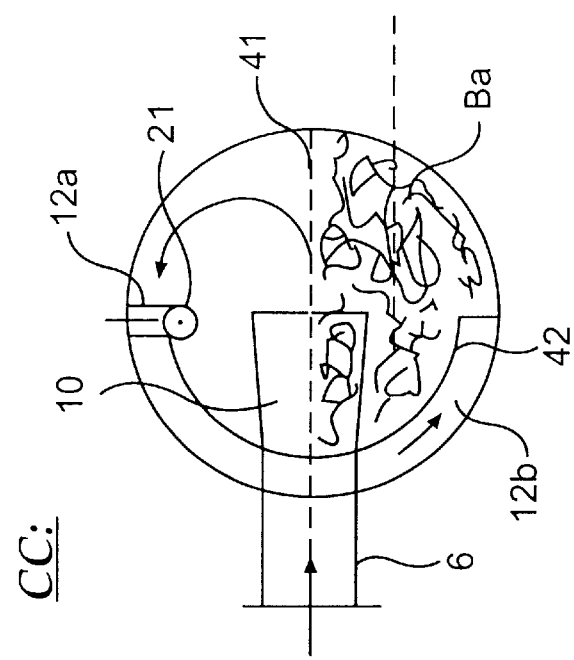
Figure 8A:
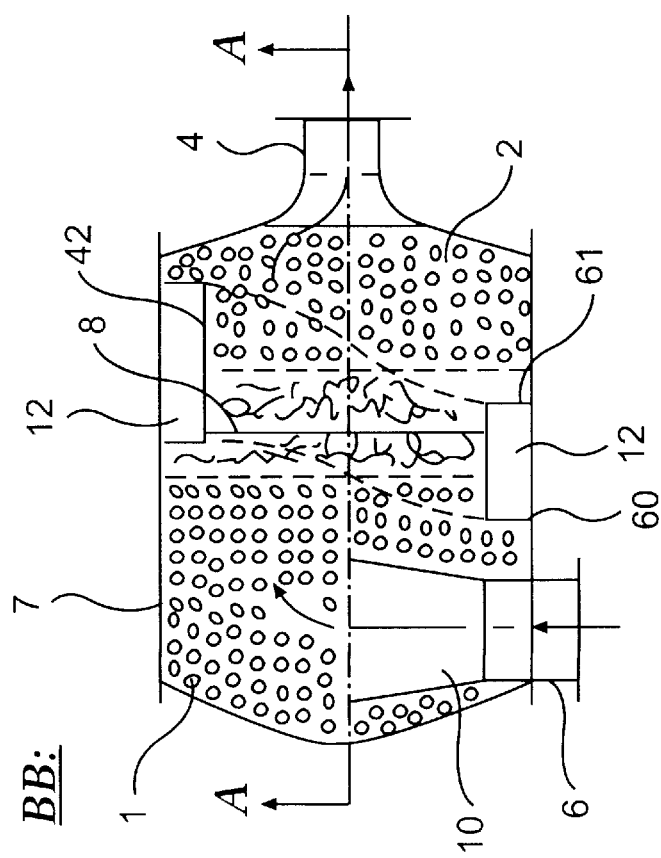
Figure 8D:
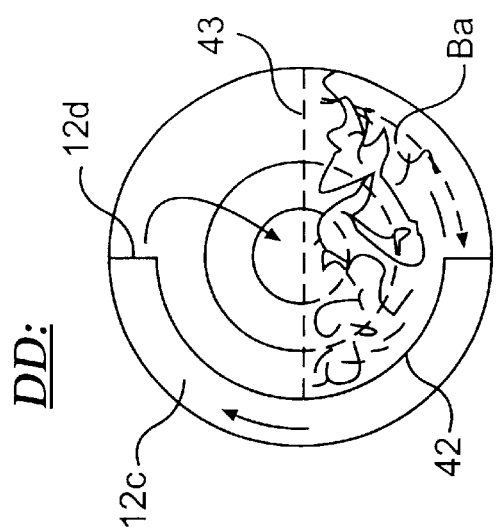
Figure 8C:
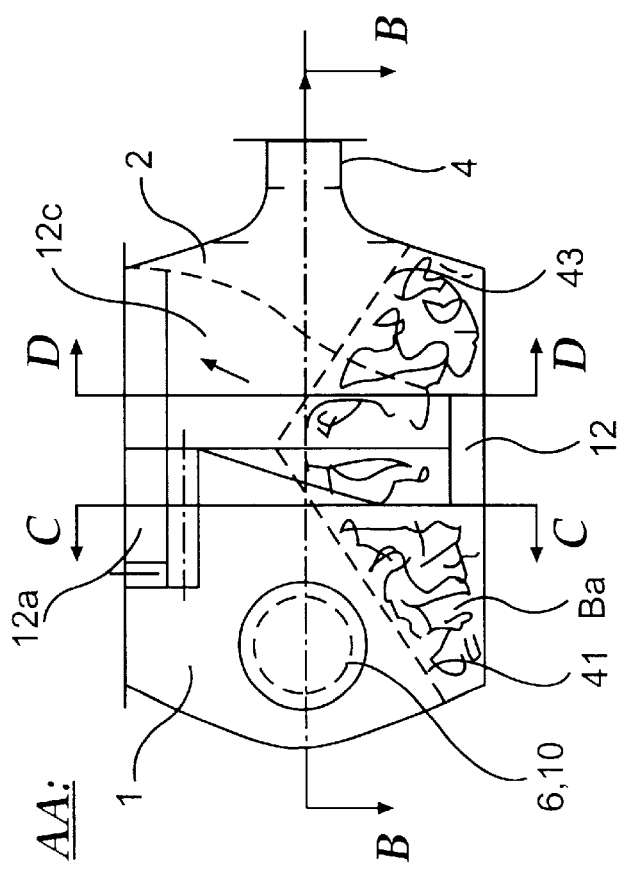
Figure 8E:
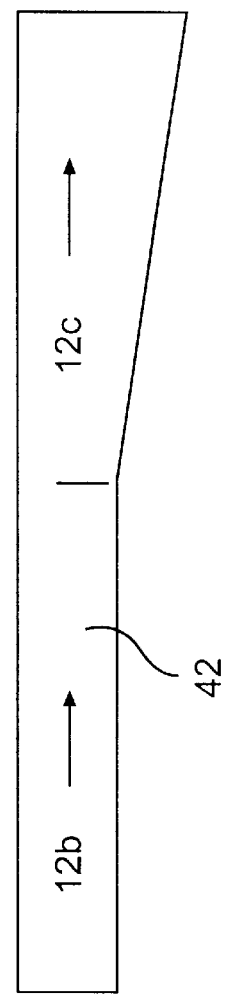

In the following, reference is made to FIG. 5. Here, $A_p$ is a chamber cross-section area, measured perpendicular to the main flow trajectory in the chamber. D is the straight line distance between the inlet to the chamber and the outlet from the chamber. s is a coordinate along the generatrix of a curved passage connecting two chambers. The passage length along the generatrix is L. $D_d$ is the direct straight line distance in space between passage inlet and outlet, obviously, $D_d$ is shorter than L.$L_1$ and $L_2$ are the lengths of the first and second chambers, respectively.

Chambers should be of a sufficient size and of an appropriate form for sound reflections to exist in an effective way at transitions of cross-sectional area and for avoiding major eddies or swirl which could otherwise cause excessive pressure drop and undesired self-generated noise.

If equation (1) is inspected in isolation, one might be led to the false conclusion that even with very small chambers it is possible to achieve an arbitrarily low natural frequency, provided the passage can be made arbitrarily low. This is, however, not true. The reason is that various phenomena, not included in the simple acoustic filter model underlying equation (1) will distort the damping effect. One problem is that small chambers may reduce or eliminate sound reflections at chamber inlets and chamber outlets. Another problem is that low-frequency resonance may be set up in connecting passages which may destroy low-frequency sound damping. Too small chambers will only serve as transfer elements which lead flow from one passage to another.

Devices according to the invention may include such small chambers, e.g., for the purpose of smoothly deflecting flow. But at least one, and often more, chambers in silencers should be sufficiently large to serve as effective elements in acoustic filters.

Accordingly, such chambers should fulfill the following two criteria:

(I) the mean cross section area A of a chamber should be at least 4 times the largest of the two cross section areas $a_1$ and $a_2$, respectively, of passages leading gas to and from the chamber, respectively, (II) the chamber volume V should at least be of the size:

$$V \geq 8(\sqrt{(a_1+a_2)/2})^3$$

Apart from this chambers may have many alternative forms for various applications.

When determining A and V, sound absorptive material should be regarded as empty space. The reason is that such material, for functioning properly as an absorbent, should not be packed too solidly or otherwise arranged in such a way that sound waves cannot enter the material rather freely. Thus, although the absorptive material is usually placed behind perforated plates for protection, the degree of perforation should not be too small.

In cases of complicated geometry, the cross section area A of the chamber should be interpreted as the mean value along the mean trajectory for sound waves travelling from chamber inlet to chamber outlet. Usually, this trajectory more or less coincides with the flow trajectory.

As a further guidance for interpreting A and V properly, it should be understood that all chamber parts in full acoustic communication with other parts of the chamber should be included. Thus, guide plates, various other chamber internals etc. should not cause a narrow restriction of A and V to such area and volume elements, respectively, which can be 'seen' directly from the trajectory through the chamber.

In addition to the above-mentioned criteria, a third criterion can be added which, as has been exemplified above, in silencers according to the invention, is often applied to at least one chamber:

(III) the flow trajectory within a chamber should turn significantly.

Typically, this can be quantified a follows:

(III') the total change of flow direction from chamber inlet to chamber outlet should be at least 90 degrees.

Thereby sound waves are prevented from shortcutting the chamber, shortcutting being a acoustic field phenomenon which may more or less hamper the acoustic filter effect, depending upon the geometry. Significant shortcutting will occur if a chamber outlet is placed close to, and aligned with, the inlet to the chamber.

However, when the distance between inlet and outlet is big, the shortcutting effect becomes small.

Regarding pressure losses across a silencer, application of criterion (III) is admittedly negative. However, when the chamber is designed properly from a fluid-dynamical point of view, the added pressure loss associated with flow turning inside the chamber can be kept moderate and may be justified because of improved sound damping. Usually, more deflections or turnings are justified when silencers are applied to engines that are only moderately sensitive to backpressure. Thus, more turnings inside chambers will, e.g., be applied to silencers for reciprocating engines than for silencers applied to gas turbines.

Sometimes narrow space limitations for silencers and chambers create a desire for a short straight-line distance between chamber inlet and outlet. The detailed geometry is then to a great extent determined as a balancing between abruptness of turning (preventing acoustic shortcutting) and prevention of flow instabilities. For a given type of geometry, the distance can (in design considerations or in experiments) be shortened down to a certain threshold, below which moderate turbulence will rather quickly turn into major flow instability, with large eddies, flow separation, etc.

This leads to a further mandatory criterion for chambers:

(IV) For a chamber fulfilling criterion (III) and/or (III') and for which overall silencer design and dimensioning demands as short a straight-line distance D as possible between chamber inlet and outlet, D should be selected to the value below which flow instability occurs in the chamber, plus a reasonable safety margin, which can normally be set in the interval of 10–50% of said straight-line distance.

The safety margin allows for variation due to a number of factors which are difficult to control, such as: Varying gas temperature, manufacture tolerances, or non-linear and destabilizing effects of gas pulsation. Those familiar with modern fluid dynamic science will appreciate that flow instability to some extent escapes today's detailed physical understanding. Nevertheless, criterion (IV) can be handled by the practical engineer in systematic experiments.

It should be noted that insertion of a diffuser to the chamber inlet lessens the instability-driving forces inside the chamber and therefore eases the design task.

Sometimes guide plates or similar devices can be fitted into chambers to stabilize the flow and help it to turn or deflect in an ordered way, preventing instability. Guide plates should not be of such a size or placed in such a way that they will cause acoustical isolation of certain chamber elements or division of a chamber into two or more subchambers.

Apart from flow instability driven by strong flow turning inside a chamber, a second type of instability may occur in poorly designed silencer chambers: Major swirl following a round contour inside a chamber. In the case of a cylindrical chamber, the entire volume may be caused to rotate (swirl) around the axis of symmetry. Like all types of flow instability, this phenomenon may cause excessive pressure drop and self-generated noise.

The two main risk factors related to this such flow instability are:

the degree of 'roundness' of the chamber, the extent of provoking fluid-dynamic forces, mainly due to tangential in- and outlets.

The roundness can be lessened by modifying the chamber form or by fitting in plates or other components into the chamber. Sometimes appropriately formed sound absorptive elements, in the form of perforated plates protecting mineral wool, may serve the double purpose of adding sound absorption and making a cylinder less round. In some cases radially extending plates can be used for preventing swirl.

It is important that such elements do not pose major obstacles to the flow passing through the chamber. However, it is normally not difficult to avoid such major obstacles. The reason is that swirl of the described type generally is associated with flow directions which deviate strongly from the main trajectory of flow from inlet to outlet inside the chamber.

This has been illustrated above.

A fifth mandatory chamber design criterion can now be formulated:

(V) When there is a risk of major swirl occurring in a chamber, its geometry should be modified by inserting one or more elements which will pose one or more restrictions to such swirl. Such a modification of the geometry should be made in a way that it does not pose great obstacles to the flow from chamber inlet to chamber outlet.

Sometimes the general geometrical conditions allow the silencer designer to select the length of connecting passages rather freely. In other circumstances there is a strong impetus to find ways of making the length of a chamber-connecting passage or of a tail-pipe longer than what seems possible with known silencer geometries. An example of this is when two or more chambers are to be fitted into a rather short silencer casing, in which case it may seem difficult to avoid a short connecting passage, which leads to a rather high natural frequency and rather poor damping of low-frequent sound.

If the designer disregards pressure drops, it is not difficult for him to achieve long passages by adopting one or more sharp turnings of the passage. However, this seldom leads to good performance and is in accordance with the present invention.

Flow-friendly, long passages can be created by subdividing the passage into two or more, parallel passages, each having smaller transverse dimensions. For example, a circular pipe may be subdivided into several smaller-diameter pipes, whose aggregate cross-sectional areas equal the cross sectional area of the single, larger-diameter pipe. Smaller transverse dimensions allow for sharper turnings, since 'flow-friendliness' is very much related to the ratio between radius of curvature and transverse dimension.

As a general criterion, applicable to both single and multiple parallel silencer passages, the following may be prescribed:

(VI) When passages diverge from straight forms, causing the general flow trajectory within the passage to bend or turn, the passage form should be such that the radius of curvature of the trajectory nowhere along the trajectory, or at least almost nowhere, is smaller than the smallest transverse size of the passage, as measured perpendicular to the trajectory tangent at the point of inspection.

Subdivision of passages is feasible in some circumstances. Drawbacks with this route to prolonged passages are: Increased manufacturing costs and added skin friction pressure losses in the passages.

A way of increasing passage length, which deviates strongly from prior silencer art, but which can be very efficient, relies on utilizing the third dimension when selecting the form of a passage. In many cases, this can be done conveniently by selecting a helical form for the passage (as has been shown in detail above), but alternative forms are also possible.

The general idea is that the prolonged passage fulfills one of the following two criteria, or both:

(VII) the acoustically effective length L of the passage is at least 1.5 times the direct and straight distance in space between the passage inlet and outlet, (VIII) the acoustically effective length L of the passage is at least equal to:
  in case the passage connects two chambers: the sum of the lengths of the two chambers,
  in case the passage is a tail pipe from a silencer: the length of the chamber being connected to the atmosphere by the tail-pipe.

Helical and other passage forms are in addition characterized in that:

(IX) the mean trajectory of the passage is not contained within a plane surface.

A necessary condition for a prolonged passage to provide effective low-frequency sound damping is that the chamber, or the chambers, to which the passage is connected, fulfills at least both above-mentioned criteria (I) and (II). Thus, helical or other prolonged passage forms should not be adopted in combination with inadequate chambers, as explained above.

Criteria (VII) and (VIII) are based on the concept of 'acoustically effective length L'. In principle, L should be measured along the mean trajectory for acoustic energy propagation within the passage. Usually, this will coincide more or less with the mean flow trajectory.

In most cases, prolonged passages according to the invention are made with solid walls, not allowing acoustic energy to deviate from the passage through the walls, since this would hamper the acoustic function of the passage in combination with the one or more chambers to which it is connected. However, to a limited extent perforations or other openings in the walls of the passage can be permitted, in particular when the passage is made longer than what is necessary to provide a sufficiently low natural frequency. Thus, a long passage could for instance have perforations along part of its length, combined with sound absorptive material being placed on the other side of the perforated part.

In principle of using a helical passage form can also be applied to the tail pipe, i.e. the pipe leading exhaust gas from a silencer to the exterior environment, such as the atmosphere. For example, a helical pipe can be wound round a cylindrical casing, ending up with a short straight end section of the tail pipe. The helical pipe may also be extended backwards, into the last chamber of the silencer, to provide a smooth outflow in tangential direction. This configuration can be used to achieve a low natural frequency of the system constituted by the tail pipe and the last chamber, even when the exhaust to the exterior environment is prescribed to be positioned close to the silencer. This is a frequent situation in trucks and busses with silencers placed close to a front wheel and with sidewise exhaust from the vehicle.

What is claimed is:

1. A device for silencing a gas flow directed therethrough and being adapted for installation in a flow system, said device comprising:
  a casing,
  at least one acoustic chamber contained in the casing, said chamber being adapted to have a gas flow therethrough,
  at least one inlet pipe for leading gas into one of said at least one acoustic chamber,
  at least one passage of a length L and of a representative cross-sectional area a for leading gas from each one of the at least one acoustic chamber to another of the at least one acoustic chamber or to an exterior environment or an exterior chamber, and
  at least two transitions of cross-sectional area for the flow of the gas therethrough between a relatively lower cross-sectional area $a_i$ and a relatively higher cross-sectional area $A_i$,
the structure of the device, including the above features, being such that the device fulfills the following criteria:
  (i) the average sound attenuation $\overline{AdB}$ conferred by each transition of cross-sectional area, approximately by the following expression:

$$\overline{\Delta dB} = \frac{1}{n} k \sum_{i=1}^{n} \log_{10} \frac{A_i}{a_i},$$

where n is the total number of transitions of cross-sectional area of the device, $A_i$ is the relatively higher cross-sectional area at the i'th transition of cross-sectional area of the gas flow, $a_i$ is the relatively lower cross-sectional area at the i'th change of cross-sectional area of the gas flow, and k is an empirically determined constant of the value 6.25 dB, is at least 2.9 dB when the device comprises no more than two acoustic chamber, 1.8 dB when the device comprises three acoustic chambers, and 1.1 dB when the device comprises 4 or more acoustic chambers, (ii) the pressure loss over each acoustic chamber expressed as the dimensionless parameter $\zeta_j'$, defined as the ratio between the static pressure loss over the chamber and the dynamic pressure at a location in said passage leading from the chamber:

$$\zeta_j' = \frac{\Delta p_j}{\frac{1}{2}\rho u^2},$$

where $\Delta p_j$ is the static pressure loss over the j'th chamber, $\rho$ is the density of the gas at said location, and u is the mean gas velocity at said location, is at the most 1.5, and (iii) the pressure loss of at least one particular chamber, expressed as the dimensionless parameter $\zeta_j'$, is at most 0.25.

2. A device according to claim 1, wherein said absorptive material is provided within at least one acoustic chamber.

3. A device according to claim 2, wherein sound absorptive material is provided within each acoustic chamber.

4. A device according to claim 1, further comprising at least one diffuser for diffusing at least part of said gas flow flowing through at least one of said passages.

5. A device according to claim 1, wherein a local natural frequency, $f_e$, of at least one sub-system comprising the gas of two consecutive acoustic chambers $AC_j$ and $AC_{j+1}$ and the gas of the passage interconnecting said two acoustic chambers, as approximated by the following expression:

$$f_e = \frac{c}{2\pi} \sqrt{\frac{a}{L}\left(\frac{1}{V_j} + \frac{1}{V_{j+1}}\right)},$$

where $V_j$ and $V_{j+1}$ are the volumes of the chambers $AC_j$ and $AC_{j+1}$ respectively, a is a representative cross-sectional area of the passage interconnecting the two consecutive acoustic chambers, L is the length of the passage, and c is the local sound velocity, is at the most 0.75 times a characteristic frequency of the flow system.

6. A device according to claim 5, wherein the characteristic a frequency is the frequency at which the unattenuated noise source spectrum has its maximum.

7. A device according to claim 5, wherein the characteristic frequency is the frequency at which the unattenuated dB(C)-weighted spectrum has its maximum.

8. A device according to claim 5, wherein the characteristic frequency is the frequency at which the unattenuated dB(A)-weighted spectrum has its maximum.

9. A device according to claim 5, wherein the characteristic frequency is the frequency at which the unattenuated unweighted spectrum has its maximum.

10. A device according to claim 5, wherein the flow system comprises a piston engine, the characteristic frequency being the ignition frequency of the piston engine.

11. A device according to claim 5, wherein said local natural frequency is at the most 0.5 times the characteristic frequency of the flow system.

12. A device according to claim 11, wherein said local natural frequency is at the most 0.4 times the characteristic frequency of the flow system.

13. A device according to claim 12, wherein said local natural frequency is at the most 0.3 times the characteristic frequency of the flow system.

14. A device according to claim 13, wherein said local natural frequency is at the most 0.25 times the characteristic frequency of the flow system.

15. A device according to claim 14, wherein said local natural frequency is at the most 0.2 times the characteristic frequency of the flow system.

16. A device according to claim 15, wherein said local natural frequency is at the most 0.15 times the characteristic frequency of the flow system.

17. A device according to claim 16, wherein said local natural frequency is at the most 0.1 times the characteristic frequency of the flow system.

18. A device according to claim 1, wherein $\zeta_j'$ of at least one acoustic chamber except said particular chamber is at most 1.0.

19. A device according to claim 18, wherein $\zeta_j'$ of at least one acoustic chamber except said particular chamber is at most 0.75.

20. A device according to claim 19, wherein $\zeta_j'$ of at least one acoustic chamber except said particular chamber is at most 0.5.

21. A device according to claim 20, wherein $\zeta_j'$ of at least one acoustic chamber is at most 0.25.

22. A device according to claim 21, wherein $\zeta_j'$ of each acoustic chamber is at most 0.25.

23. A device according to claim 22, wherein $\zeta_j'$ of at least one acoustic chamber is at most 0.

24. A device according to claim 23, wherein $\zeta_j'$ of at least one acoustic chamber is less than 0.

25. A device according to claim 1, wherein the average sound attenuation $\overline{\Delta dB}$ conferred by the transitions of cross-sectional area, approximated by the expression given under (i) in claim 1 is at least 3.7 dB when the device comprises no more than two acoustic chambers, 2.9 dB when the device comprises three acoustic chambers, and 1.9 dB when the device comprises 4 or more acoustic chambers.

26. A device according to claim 25, wherein the average sound attenuation $\overline{\Delta dB}$ conferred by the transitions of cross-sectional area, approximated by the expression given under (i) in claim 1 is at least 5.6 dB when the device comprises no more than two acoustic chambers, 4.8 dB when the device comprises three acoustic chambers, and 3.7 dB when the device comprises 4 or more acoustic chambers.

27. A device according to claim 1, wherein curvatures, preventing flow separation, are applied to at least part of the contour of at least one of the at least one passage and/or the inlet pipe.

28. A device according to claim 1, further comprising one or more radial diffusers and/or one or more axial diffusers and/or one or more circular conical diffusers and/or one or more annular diffusers and/or a plurality of conical diffusers arranged on a substantially cylindrical surface and/or one or more diffusers for reversing the direction of flow and/or one or more double diversion diffusers.

29. A device according to claim 28, wherein each acoustic chamber is substantially cylindrical, and wherein one or more outlets from said at least one diffuser are located substantially at the axial centre of the chamber associated with said diffuser.

30. A device according to claim 1, wherein each acoustic chamber is substantially cylindrical, said chamber thereby defining a cylindrical axis, and wherein one or more outlets from said least one diffuser are located at a distance from the cylindrical axis of approximately two thirds of the radius of the acoustic chamber.

31. A device according to claim 5, comprising m acoustic chambers, m being at least 2, wherein the following applies to each of at least m−1 of the acoustic chambers:
the inlet passage leading gas to the chamber is provided with a diffuser or a diffuser element,
a curvature or curvatures, preventing flow separation, are applied to at least part of the contour of all passages leading gas out of the chamber,
the pressure loss across the chambers, except for said particular chamber expressed as $\zeta_j'$ is less than or equal to 1.5,
the approximated average sound attenuation $\overline{\Delta dB}$ conferred by each transition of cross-sectional area is at least:
2.9 dB for m=2,
1.8 dB for m=3, and
1.1 dB for m>3,
and wherein the following applies to each of at least m−2 of the passages interconnecting two consecutive acoustic chambers or interconnecting an acoustic chamber and the exterior environment or chamber:
the approximated local natural frequency, $f_e$, is at the most 0.75 times a characteristic frequency of the flow system.

32. A device according to claim 31 wherein the following applies to each of at least m−1 of the acoustic chambers:
the pressure loss across the chamber, except said particular chamber, expressed as $\zeta_j'$ is less than or equal to 1.0,
the approximated average sound attenuation $\overline{\Delta dB}$ conferred by each transition of cross-sectional area is at least:
3.7 dB for m=2,
2.9 dB for m=3, and
1.8 dB from >3.

33. A device according to claim 32 wherein the following applies to each of at least m−1 of the acoustic chambers:
the pressure loss across the chamber, except said particular chamber, expressed as $\zeta_j'$ is less than or equal to 1.0,
the approximated average sound attenuation $\overline{\Delta dB}$ conferred by each transition of cross-sectional area is at least:
5.6 dB for m=2,
4.8 dB for m=3, and
3.7 dB for m>3,
and wherein the following applies to each of at least m−2 of the passages interconnecting two consecutive acoustic chambers or interconnecting an acoustic chamber and the exterior environment or chamber:
the approximated local natural frequency, $f_e$, is at the most 0.5 times a characteristic frequency of the flow system.

34. A device according to claim 31 wherein the criteria of applies to all acoustic chambers and to all passages.

35. A device according to claim 1, wherein the sound level of self-generated noise of each one of said at least two acoustic chambers at maximum gas flow rate is less than 5 dB(A) higher than the self-generated noise of a circular cylindrical reference chamber having gas flow therethrough at said gas flow rate, the cross-sectional area of the inlet passage leading gas into said acoustic chamber being $a_1$, the cross-sectional area of the passage leading gas from said acoustic chamber being $a_2$, said reference chamber:
being of the same volume as each of said at least one acoustic chamber,
having a length equal to its diameter,
having flat end caps,
being provided with centrally positioned holes in its flat end caps,
having a first end cap which is connected to a cylindrical inlet pipe of a cross-sectional area which is approximately equal to $a_1$, the terminating surface of said cylindrical inlet pipe being aligned with said first end cap, and
having a second end cap which is connected to a cylindrical outlet pipe of a cross-sectional area which is approximately equal to $a_2$, said cylindrical outlet pipe having a rounded inner edge at its interconnection with said second end cap and being aligned with said second end cap.

36. A device according to claim 1, wherein at least part of the outlet and/or inlet pipe or a passage of the device have curvatures that prevent flow separation, said passage being the inlet pipe or its extension into the device and/or the outlet pipe or its extension into the device and/or a passage connecting two chambers.

37. A device according to claim 1, wherein at least one passage is annular, constituted at least in part by an inner cylinder and by an outer cylinder.

38. A device according to claim 37, wherein the at least one annular passage is a passage connecting first and second chambers.

39. A device according to claim 38, wherein the at least one annular connecting passage has a cross sectional area that increases in the flow direction.

40. A device according to claim 39 in which said annular connecting passage comprises a constant flow area part and an outlet diffuser part.

41. A device according to claim 40 in which a continuation cylinder of said inner cylinder extends into said first chamber, the continuation cylinder having substantially the same diameter as said inner cylinder, and said outer cylinder is connected to a flow-guiding body having a curvature.

42. A device according to claim 41 in which sound absorptive material is contained within said inner cylinder and/or within the continuation cylinder extending into said first chamber and/or within a continuation cylinder of inner cylinder extending into said second chamber.

43. A device according to claim 42 wherein at least part of one or both continuation cylinders is perforated.

44. A device according to claim 43 in which the outflow from said annular connecting passage passes into an annular passage inside said second chamber, said annular passage comprising at least a perforated portion of the continuation cylinder extending into the second chamber and an outer perforated cylinder, both the continuation and outer cylinders separating sound absorptive materials from gas flow within said second chamber.

45. A device according to claim 44 in which the outflow from said annular connecting passage passes directly into the annular passage.

46. A device according to claim 45 in which the distance (D1) between the inlet pipe to said first chamber and the inlet to said annular passage is so large that substantially no unstable flow occurs in the first chamber.

47. A device according to claim 44 wherein the continuation cylinder extending into the second chamber has a substantially non-perforated portion that constitutes at least part of an inner wall of the outlet diffuser part.

48. A device according to claim 47 wherein the substantially non-perforated portion of the inner cylinder constitutes at least part of an inner wall of the second chamber.

49. A device according to claim 1 wherein at least one passage is provided with a diffuser or a diffuser element at its outlet.

50. A device according to claim 1, wherein at least part of at least one passage is curved, the generatrix of the curved part of the passage being wound in a peripheral direction such that at least part of the curved passage has a plane spiral form.

51. A device according to claim 1, wherein at least part of at least one passage is curved, the generatrix of the curved part of the passage being wound in a peripheral direction, said part of said curved passage extending in a longitudinal direction, so as to form a screw-like helical form.

52. A device according to claim 1, wherein at least part of at least one passage is curved, the generatrix of the curved part of the passage extending along a surface of revolution.

53. A device according to claim 52, wherein at least part of the surface of revolution is conical.

54. A device according to claim 50, wherein the curved part of the passage extends radially over an angle between 0° and 90°.

55. A device according to claim 50, wherein the curved part of the passage extends radially over an angle between 90° and 180°.

56. A device according to claim 50, wherein the curved part of the passage extends radially over an angle between 180° and 270°.

57. A device according to claim 50, wherein the curved part of the passage extends radially over an angle between 270° and 360°.

58. A device according to claim 50, wherein the curved part of the passage extends radially over an angle between 360° and 720°.

59. A device according to claim 50, wherein the curved part of the passage extends radially over an angle of 720° or more.

60. A device according to claim 50, wherein the device comprises at least two acoustic chambers, interconnected by the curved passage, and wherein one of the chambers surrounds the other.

61. A device according to claim 1, wherein at least part of at least one of the passages is curved and wherein a first part of the curved part of the passage extends in a first longitudinal direction and a second part of the curved part of the passage extends in a second longitudinal direction which is opposite to said first longitudinal direction.

62. A device according to claim 1 wherein at least part of a tail pipe interconnecting one of said acoustic chambers and an exterior environment or an exterior chamber comprises a curved passage, and wherein at least part of the curved passage of the tail pipe is wound around an outer surface of the casing.

63. A device according to claim 1 further comprising one or more monolithic bodies in at least one of said acoustic chambers, and wherein the static pressure loss of the j'th chamber, $\Delta p_j$, is the static pressure loss over the j'th chamber exclusive of the static pressure loss over the monolith in this chamber.

64. A device according to claim 1, and comprising at least one monolithic body positioned upstream or downstream of an inlet passage and/or an outlet passage of the at least one acoustic chamber.

65. A device according to claim 64, wherein said at least one monolithic body is positioned substantially immediately upstream or substantially immediately downstream of said inlet passage and/or said outlet passage of the at least one acoustic chamber.

66. A device according to claim 64 wherein the at least one monolithic body is of an annular form.

67. A device according to claim 64 wherein the gas flow leaves the passage in a tangential direction at at least two locations along the passage.

68. A device according to claim 1, further comprising at least one resonance chamber through which the gas does not flow and which is in communication with at least one acoustic chamber through at least one communication passage, the volume of the at least one resonance chamber and the geometric configuration of the at least one resonance chamber and the communication passage or passages being designed to have a selected center attenuation frequency so as to supplement the sound attenuation achieved with said acoustic chambers at frequencies of said flow system around said center attenuation frequency.

69. A device according to claim 68, wherein the at least one resonance chamber encloses a sound absorptive material.

70. A device according to claim 68, wherein the volume of the at least one resonance chamber is adjustable by means of displaceable adjustment means so as to allow for a variable center attenuation frequency.

71. A device according to claim 1 wherein one or more resonance chambers are contained in said casing with the aim of providing added sound attenuation, said resonance chambers being designed as resonators with selected center frequencies.

72. A device according to claim 1, wherein the following applies to at least one selected acoustic chamber selected from said at least one acoustic chamber:

the mean cross-sectional area $A_j$ of each of said selected chamber is at least four times the largest of:
the sum of all cross-sectional areas of passages leading gas to the selected chamber, $a_1$, and
the sum of all cross-sectional areas of passages leading gas from the selected chamber, $a_2$,
the mean cross-sectional area, $A_j$, being defined as the mean value of all cross-sectional areas along a mean trajectory for sound waves travelling across the selected chamber,
the volume of the at least one selected chamber, $V_j$, is at least $8(\sqrt{(a_1+a_2)/2})^3$, $a_1$ and $a_2$ being defined as stated above,
the cross-sectional area, $A_j$, and the volume, $V_j$, including any elements containing or comprising sound absorptive material inside the selected chamber and any other parts being in acoustic communication with the selected chamber.

73. A device according to claim 72, wherein the device comprises at least two selected chambers interconnected by the at least one passage, the volume of each of the two selected chambers being at least $8(\sqrt{(\alpha_1+\alpha_2)/2})^3$.

74. A device according to claim 72, wherein the volume of the at least one selected chamber, $V_j$, is at least $16(\sqrt{(\alpha_1+\alpha_2)/2})^3$.

75. A device according to claim 72, wherein at least one selected chamber comprises deflecting means for deflecting the flow inside the chamber.

76. A device according to claim 75, wherein the deflecting means are formed so as to deflect the flow inside said at least one selected chamber at least 90 degrees.

77. A device according to claim 72, said at least one selected chamber having an inlet and one outlet, the distance between said inlet and said outlet, D, being so large that substantially no unstable flow occurs inside said selected chamber.

78. A device according to claim 77 in which, with the aim of preventing unstable flow in said at least one selected chamber, said distance D is 10–50% larger than the distance at which substantially unstable flow would occur.

79. A device according to claim 1, wherein chambers with swirl-provoking passage inlet and/or passage outlet flow directions are formed in such a way and/or provided with such internal guides, such as guide plates, that essentially no major swirl occurs in such chambers.

80. A device according to claim 79, wherein said guides are designed and dimensioned so that flow resistance caused by the guides is minimised.

81. A device according to claim 72, comprising at least one selected chamber from which at least one passage leads gas from the selected chamber to an exterior environment or chamber, said passage(s) each having an acoustically effective length L, which is at least 1.5 times the direct and straight distance in space between an inlet and an outlet of the passage.

82. A device according to claim 72, comprising at least two selected chambers being interconnected by one or more passages, each passage having an acoustically effective length L which is at least 1.5 times the direct and straight distance in space between an inlet and outlet of the passage.

83. A device according to claim 72, comprising at least one selected chamber from which at least one passage leads gas from the chamber to an exterior environment or another chamber, each passage having an acoustically effective length L, which is at least equal to the length of said selected chamber.

84. A device according to claim 72, the device comprising at least two selected chambers fulfilling the criteria of claim 72 and being connected by one or more passages each having an acoustically effective length L which is at least equal to the sum of the lengths of said two selected chambers, $L_1$ and $L_2$.

85. A device according to claim 72, each of said passages having forms causing a flow trajectory within the passage or passages to deflect, the passage form(s) being such that a radius of curvature of the trajectory at most points is greater than or equal to the transverse straight-line distance across the passage when measured perpendicular to the trajectory tangent at said points.

86. A device according to claim 1, wherein the cross-sectional area of the at least one passage is less than the cross-sectional area of the inlet pipe.

87. A device according to claim 86 further comprising a tail pipe interconnecting one of said acoustic chambers and an exterior environment or an exterior chamber and wherein the tail pipe has a cross-sectional area that is bigger than the cross-sectional area of the inlet pipe.

88. A device according to claim 87 further comprising a tail pipe interconnecting one of said acoustic chambers and an exterior environment or an exterior chamber and wherein the tail pipe has a cross-sectional area that is substantially equal to the cross-sectional area of the inlet pipe.

89. A device according to claim 87 further comprising a tail pipe interconnecting one of said acoustic chambers and an exterior environment or an exterior chamber and wherein the tail pipe has a cross-sectional area that is smaller than the cross-sectional area of the inlet pipe.

90. A vehicle comprising a combustion engine, such as a diesel engine, a petrol engine or a gas engine, and/or a gas turbine and/or a compressor and at least one device according to claim 1, the at least one device being comprised in the exhaust system of the vehicle.

91. A vehicle according to claim 90, the vehicle being a ship or boat.

92. A stationary plant comprising a combustion engine, such as a diesel engine, a petrol engine or a gas engine, and/or a gas turbine and/or a compressor and at least one device according to claim 1.

93. A method of silencing a gas flow directed therethrough, said method comprising leading gas flow through at least one device according to claim 1.

94. A device for silencing a gas flow directed therethrough and being adapted for installation in a flow system, said device comprising:

a casing, at least one acoustic chamber contained in the casing, said chamber being through-flowed by gas, at least one inlet pipe for leading gas into one of said at least one acoustic chamber, at least one passage of a length L and of a representative cross-sectional area a for leading gas from each one of the at least one acoustic chamber to another of the at least one acoustic chamber or to an exterior environment or an exterior chamber, at least one passage being annular, constituted by an inner cylinder and by an outer cylinder, said device showing at least two through-flowed transitions of cross-sectional area for the flow of the gas from between a relatively lower cross-sectional area $a_i$ and a relatively higher cross-sectional area $A_i$, the structure of the device, including the above features, being such that the devices fulfills the following criteria:

(i) the average sound attenuation $\overline{\Delta dB}$ conferred by each transition of cross-sectional area, approximated by the following expression:

$$\overline{\Delta dB} = \frac{l}{n} k \sum_{i=1}^{n} \log_{10} \frac{A_i}{a_i},$$

n being the total number of transitions of cross-sectional area of the device, $A_i$ being the relatively higher cross-sectional area at the i'th transition of cross-sectional area of the gas flow, $a_i$ being the relatively lower cross-sectional area at the i'th change of cross-sectional area of the gas flow, k being an empirically determined constant of the value 6.25 dB, is at least 2.9 dB when the device comprises no more than two acoustic chambers, 1.8 dB when the device comprises three acoustic chambers, 1.1 dB when the device comprises 4 or more acoustic chambers, (ii) the pressure loss over each acoustic chamber expressed as the dimensionless parameter $\zeta_j'$, defined as the ratio between the static pressure loss over the chamber and the dynamic pressure at a location in said passage:

$$\zeta_j' = \frac{\Delta p_j}{\frac{1}{2}\rho u^2},$$

$\Delta p_j$ being the static pressure loss over the j'th chamber, exclusive of the static pressure loss over a monolith optionally comprised in the j'th chamber, $\rho$ being the density of the gas at said location, u being a velocity of the gas at said location, preferably the mean gas velocity, is at the most 1.5.

95. A device according to claim 94, wherein the pressure loss of at least one particular chamber, expressed as the dimensionless parameter $\zeta_j'$, is at most 0.25.

96. A device according to claim 94, wherein said at least one passage which is annular is a diffuser.

97. A device according to claim 94, wherein the at least one acoustic chamber comprises two consecutive acoustic chambers, and wherein a local natural frequency, $f_e$, of at least one sub-system comprising the gas of the two consecutive acoustic chambers $AC_j$ and $AC_{j+1}$ and the gas of the passage interconnecting said two acoustic chambers, as approximated by the following expression:

$$f_e = \frac{c}{2\pi}\sqrt{\frac{a}{L}\left(\frac{1}{V_j} + \frac{1}{V_{j+1}}\right)},$$

where $V_j$ and $V_{j+1}$ are the volumes of the chambers $AC_j$ and $AC_{j+1}$ respectively, a is a representative cross-sectional area of the passage interconnecting the two consecutive acoustic chambers, L is the length of the passage, and c is a local sound velocity, is at the most 0.75 times a characteristic frequency of the flow system.

98. A device according to claim 94, wherein the annular passage includes an inner cylinder and an outer cylinder, and in which a continuation cylinder of said inner cylinder extends into a first one of said at least one chamber, the continuation cylinder having substantially the same diameter as said inner cylinder, and wherein said outer cylinder is connected to a flow-guiding body having a curvature.

99. A device according to claim 98 in which sound absorptive material is contained within at least one of
said inner cylinder;
the continuation cylinder extending into said first chamber; and
the continuation cylinder of the inner cylinder extending into a second one of said at least one chamber.

100. A device according to claim 99, wherein at least part of one or both continuation cylinders is perforrated.

101. A device according to claim 94, wherein the at least one annular passage is provided with a diffuser at its outlet.

102. A device according to claim 94, and comprising at least one monolithic body positioned upstream of an inlet passage of the at least one acoustic chamber or downstream of an outlet passage of the at least one acoustic chamber.

103. A device according to claim 102, wherein the at least one monolithic body is annular.

104. A device for silencing a gas flow directed therethrough and being adapted for installation in a flow system, said device comprising:
a casing,
at least one acoustic chamber contained in the casing, said chamber being adapted to have a gas flow therethrough,
at least one inlet pipe for leading gas into one of said at least one acoustic chamber,
at least one passage of a length L and of a representative cross-sectional area a for leading gas from each one of the at least one acoustic chambers to another of the at least one acoustic chambers or to an exterior environment or an exterior chamber,
at least two transitions of cross-sectional area for the flow of the gas therethrough, each transition being between a relatively lower cross-sectional area $a_i$ and a relatively higher cross-sectional area $A_i$, and
at least one passage selected from said at least one passage being curved,
wherein the following applies to at least one selected chamber selected from said at least one acoustic chamber:
the mean cross-sectional area $A_j$ of each of said selected chamber is at least four times the largest of:
the sum of all cross-sectional areas of passages leading gas to the selected chamber, $a_1$, and
the sum of all cross-sectional areas of passages leading gas from the selected chamber, $a_2$,
the mean cross-sectional area, $A_j$, being defined as the mean value of all cross-sectional areas along a mean trajectory for sound waves travelling from across the selected chamber, and
the volume of the at least one selected chamber, $V_j$, as at least $8(\sqrt{(\alpha_1+\alpha_2)/2})^3$, $a_1$ and $a_2$ being defined as stated above, with the cross-sectional area, $A_j$, and the volume, $V_j$, including any elements belonging to sound absorptive material inside the selected chamber and any other parts being in acoustic communication with the selected chamber.

105. A device according to claim 104, wherein the device comprises at least two selected chambers interconnected by the at least one passage, the volume of each of the two selected chambers being at least $8(\sqrt{(\alpha_1+\alpha_2)/2})^3$.

106. A device according to claim 104, wherein the volume of the at least one selected chamber, $V_j$, is at least $16(\sqrt{(\alpha_1+\alpha_2)/2})^3$.

107. A device according to claim 104, wherein at least one selected chamber comprises deflecting means for deflecting the flow inside the chamber.

108. A device according to claim 107, wherein the deflecting means are formed so as to deflect the flow inside said at least one selected chamber at least 90 degrees.

109. A device according to claim 104, said at least one selected chamber having an inlet and one outlet, the distance between said inlet and said outlet, D, being so large that substantially no unstable flow occurs inside said selected chamber.

110. A device according to claim 107 in which, with the aim of preventing unstable flow in said at least one selected chamber, said distance D is 10–50% larger than the distance at which substantially unstable flow would occur.

111. A device according to claim 104, wherein chambers with swirl-provoking passage inlet and/or passage outlet flow directions are formed in such a way and/or provided with such internal guides, such as guide plates, that essentially no major swirl occurs in such chambers.

112. A device according to claim 111, wherein said guides are designed and dimensioned so that flow resistance caused by the guides is minimised.

113. A device according to claim 104, comprising at least one selected chamber from which at least one passage leads gas from the selected chamber to the exterior environment or chamber, said passage(s) each having an acoustically effective length L, which is at least 1.5 times the direct and straight distance in space between an inlet and outlet of the passage.

114. A device according to claim 104, comprising at least two selected chambers being interconnected by one or more passages each having an acoustically effective length L which is at least 1.5 times the direct and straight distance in space between an inlet and outlet of the passage.

115. A device according to claim 104, comprising at least one selected chamber from which at least one passage leads gas from the chamber to the exterior environment or another chamber, each passage having an acoustically effective length L, which is at least equal to the length of said at least one selected chamber.

116. A device according to claim 104, the device comprising at least two selected chambers and being connected by one or more passages each having an acoustically effective length L which is at least equal to the sum of the lengths of said two selected chambers, $L_1$ and $L_2$.

117. A device according to claim 104, each of said passages having forms causing a flow trajectory within the passage or passages to deflect, the passage form(s) being such that the radius of curvature of the trajectory at most points is greater than or equal to the transverse straight-line distance across the passage when measured perpendicular to the trajectory tangent at said points.

118. A device according to claim 104, wherein the at least one acoustic chamber comprises two consecutive acoustic chambers, and wherein a local natural frequency, $f_e$, of at least one sub-system comprising the gas of the two consecutive acoustic chambers $AC_j$ and $AD_{j+1}$ and the gas of the passage interconnecting said two acoustic chambers, as approximated by the following expression:

$$f_e = \frac{c}{2\pi}\sqrt{\frac{a}{L}\left(\frac{1}{V_j} + \frac{1}{V_{j+1}}\right)},$$

where $V_j$ and $V_{j+1}$ are the volumes of the chambers $AC_j$ and $AC_{j+1}$ respectively, a is a representative cross-sectional area of the passage interconnecting the two consecutive acoustic chambers, L is the length of the passage, and c is a local sound velocity, is at the most 0.75 times a characteristic frequency of the flow system.

119. A device for silencing a gas flow directed therethrough and being adapted for installation in a flow system, said device comprising:
 a casing,
 at least two acoustic chambers contained in the casing, said chambers being adapted to have a gas flow therethrough,
 at least one inlet pipe for leading gas into one of said at least two acoustic chambers,
 at least one passage of a length L and of a representative cross-sectional area a for leading gas from each one of the at least two acoustic chambers to another of the at least two acoustic chambers or to an exterior environment or an exterior chamber, and at least two transitions of cross-sectional area for the flow of the gas therethrough, each transition being between a relatively lower cross-sectional area $a_i$ and a relatively higher cross-sectional area $A_i$ or vice-versa, said inlet pipe being continued by a flow deflecting element causing the gas to flow with a radial component and for causing pressure recovery to the flow upstream of a first one of said at least two acoustic chambers, wherein said passage comprises at least one diffuser for leading the gas flow into a second one of said at least two acoustic chambers, the diffuser of said passage being an annular diffuser.

120. A device according to claim 119 wherein the pressure loss of at least one particular chamber, expressed as the dimensionless parameter $\zeta_j'$, is at most 0.25.

121. A flow system comprising at least one device according to claim 118.

122. A flow system according to claim 121, and comprising an internal combustion engine, with the characteristic frequency of the system being the firing frequency of the engine.

123. A flow system according to claim 121, and comprising a gas turbine and/or a compressor.

124. A flow system according to claim 123, with the characteristic frequency of the gas turbine or the compressor being a predominant low-frequency peak in the unattenuated sound level spectrum, determinable by measurement or from known design features, and/or a mid-octave band frequency which is lower than the measured peak sound level octave band and below which frequency the sound level generally falls off with further lowered frequency.

125. A device according to claim 119, wherein the annular diffuser includes an inner cylinder and an outer cylinder, and in which a continuation cylinder of said inner cylinder extends into a first one of said at least one chamber, the continuation cylinder having substantially the same diameter as said inner cylinder, and wherein said outer cylinder is connected to a flow-guiding body having a curvature.

126. A device according to claim 125 in which sound absorptive material is contained within at least one of
 said inner cylinder;
 the continuation cylinder extending into said first chamber; and
 the continuation cylinder of the inner cylinder extending into a second one of said at least one chamber.

127. A device according to claim 126, wherein at least part of one or both continuation cylinders is perforated.

128. A device according to claim 119, and comprising at least one monolithic body positioned upstream of an inlet passage of the at least one acoustic chamber or downstream of an outlet passage of the at least one acoustic chamber.

129. A device according to claim 128, wherein the at least one monolithic body is annular.

130. A method according to claim 124 wherein the value of k is in the range 6–6.5.

131. A method according to claim 124 wherein the value of k is 6.25.

132. A method for dimensioning a device for silencing a gas flow directed therethrough, said device being adapted for installation in a flow system and comprising:
 a casing,
 at least one acoustic chamber contained in the casing, said chamber being adapted to have a gas flow therethrough,
 at least one inlet pipe for leading gas into one of said at least one acoustic chamber,
 at least one passage of a length L and of a representative cross-sectional area a for leading gas from each one of the at least one acoustic chamber to another of the at least one acoustic chamber or to an exterior environment or an exterior chamber, and at least one transition of cross-sectional area for the flow of the gas therethrough, each transition being between a relatively lower cross-sectional area $a_i$ and a relatively higher cross-sectional area $A_i$ or vice-versa, the method comprising approximating:

(I) the local natural frequency, $f_e$, of one or more mass systems comprising the gas mass of two consecutive acoustic chambers, $AC_j$ and $AC_{j+1}$, by applying the following expression:

$$f_e = \frac{c}{2\pi} \sqrt{\frac{a}{L}\left(\frac{1}{V_j} + \frac{1}{V_{j+1}}\right)},$$

where $V_j$ and $V_{j+1}$ are the volumes of the chambers $AC_j$ and $AC_{j+1}$ respectively, the volume $V_{j+1}$ being set to infinite when the chamber $AC_j$ is connected to an exterior environment or an exterior chamber in a downstream direction, a is a representative cross-sectional area of the passage interconnecting the two consecutive acoustic chambers or the acoustic chamber $AC_j$ and the exterior environment, L is the length of the passage, and c is the local sound velocity, and (II) the sound attenuation $\Delta dB_i$ conferred by one or more of the at least one transition of cross-sectional area by applying the following expression:

$$\Delta dB_i = k \log_{10} A_i/a_i,$$

where $A_i$ is the relatively higher cross-sectional area at the i'th transition of cross-sectional area of the gas flow, $a_i$ is the relatively lower cross-sectional area at the i'th transition of cross-sectional area of the gas flow, and k is an empirically determined constant, for adapting two or more of the following parameters relative to each other:

(a) the length L and the representative cross-sectional area a of one or more of the at least one passage, (b) the number of changes, n, of transitions of cross-sectional area for the flow of the gas between a relatively lower cross-sectional area $a_i$ and a relatively higher cross-sectional area $A_i$, (c) the number of acoustic chambers, m, comprised in the casing, (d) the relatively lower cross-sectional area $a_i$ (i=1 ... n) and the relatively higher cross-sectional area $A_i$ (i=1 ... n) of each one of the n changes of cross-sectional area, (e) the volume or volumes, $V_j$ (j=1 ... m), of each one of the m acoustic chambers comprised in the casing, (f) the natural frequency, $f_e$, of one or more domains of the device comprising two consecutive acoustic chambers $AC_j$ and $AC_{j+1}$, or (g) the total sound attenuation conferred by the device.

133. A method according to claim 132, said method comprising adapting:

(a) the length L and the representative cross-sectional area a of each one of the at least one passage, (b) the number of changes, n, of cross-sectional area for the flow of the gas between the relatively lower cross-sectional area $a_i$ and the relatively higher cross-sectional area $A_i$, (c) the number of acoustic chambers, m, comprised in the casing, (d) the relatively lower cross-sectional area $a_i$ (i=1 ... n) and the relatively higher cross-sectional area $A_i$ (i=1 ... n) of each one of the n changes of cross-sectional area, (e) the volume or volumes, $V_j$ (j=1 ... m), of each one of the m acoustic chambers comprised in the casing, (f) the natural frequency, $f_e$, of any domain of the device comprising two consecutive acoustic chambers $AC_j$ and $AC_{j+1}$, and (g) the total sound attenuation $\Sigma\Delta dB$ conferred by the device, relative to each other by performing the steps of:

(i) restricting the values of one or more of the parameters (a)–(g) by assigning a predetermined value or a predetermined limit to each one of said one or more parameters, (ii) assigning values to the parameters a, L, $a_i$ and $A_i$ if predetermined values have not been assigned to those parameters at step (1), (iii) approximating the local natural frequency, $f_e$, of any domain of the device comprising two consecutive acoustic chambers $AC_j$ and $AC_{j+1}$ by applying the following expression:

$$f_e = \frac{c}{2\pi} \sqrt{\frac{a}{L}\left(\frac{1}{V_j} + \frac{1}{V_{j+1}}\right)},$$

where $V_j$ and $V_{j+1}$ is the volumes of the chambers $AC_j$ and $AC_{j+1}$ respectively, the volume $V_2$ being set to infinite when the chamber $AC_j$ is connected to an exterior environment or an exterior chamber in a downstream direction, a is a representative cross-sectional area of the passage interconnecting the two consecutive acoustic chambers or the acoustic chamber $AC_j$ and the exterior environment, L is the length of the passage, and c is the local sound velocity, (iv) if a value or a limit for the local natural frequency has been prescribed at step (i), comparing said value or limit to $f_e$ as determined at step (iii), (v) approximating the total sound attenuation $\Sigma\Delta dB$ conferred by the device by applying the following expression:

$$\sum \Delta dB = k \sum_{i=1}^{n} \log \frac{A_i}{a_i}$$

where n is the total number of changes of cross-sectional area of the gas flow, $A_i$ is the relatively higher cross-sectional area at the i'th change of cross-sectional area of the gas flow, $a_i$ is the relatively lower cross-sectional area at the i'th change of cross-sectional area of the gas flow, and k is an empirically determined constant, (vi) if a value or a limit for the total sound attenuation of the device has been prescribed at step (i), comparing said value or limit to $\Theta\Delta dB$ as determined at step (v), and (vii) if the comparisons performed at steps (iv) and (vi) reveal that the limitations prescribed at step (i) are not fulfilled, updating the values of the parameters set at step (ii) and repeating steps (iii)–(vii) until the limitations prescribed at step (i) are achieve.

134. A method according to claim 133, further comprising applying expressions known per se for approximating the increase or decrease of static pressure at one or more of said at least one transition of cross-sectional area.

135. A method according to claim 134, comprising assigning a predetermined limit or value to the pressure loss over the device at step (i) of claim 131, and repeating steps (iii)–(vii) of claim 131 until said predetermined limit or value for the pressure loss over the device is achieved.

136. A method according to claim 133, further comprising repeating steps (iii)–(vii) until said parameters are mutually optimized.

137. A method according to claim 132 wherein the value of k is in the range 5–7.

138. A method according to claim 132, the device further comprising at least one resonance chamber with or without a therein enclosed sound absorptive material and communicating with one of said at least one acoustic chamber through at least one communication passage, the method comprising adjusting the volume of the at least one resonance chamber, and the geometric configuration of the at least one resonance chamber and the communication passage or passages being so as to have a selected center attenuation frequency so as to supplement the sound attenuation achieved with said acoustic chamber or chambers at frequencies of said flow system around said center attenuation frequency.

139. A method according to claim 138, the volume of the at least one resonance chamber being adjustable by means of a displaceable adjustment means, the method comprising adjusting the range of the volume of the at least one resonance chamber so as to allow for a variable center attenuation frequency within a given range.

140. A method according to claim 138, the device comprising one or more resonant chambers contained in said casing with the aim of providing added sound attenuation, the method comprising designing the volumes of said resonance chambers as resonators with selected center frequencies.

* * * * *